United States Patent
Mori et al.

(10) Patent No.: US 8,963,462 B2
(45) Date of Patent: Feb. 24, 2015

(54) DRIVING APPARATUS FOR MULTIPLEX-WINDING ROTARY MACHINE

(71) Applicants: Tatsuya Mori, Tokyo (JP); Tetsuya Kojima, Tokyo (JP)

(72) Inventors: Tatsuya Mori, Tokyo (JP); Tetsuya Kojima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 166 days.

(21) Appl. No.: 13/727,020

(22) Filed: Dec. 26, 2012

(65) Prior Publication Data

US 2013/0249454 A1    Sep. 26, 2013

(30) Foreign Application Priority Data

Mar. 26, 2012 (JP) ................. 2012-068570

(51) Int. Cl.
| | |
|---|---|
| H02P 6/16 | (2006.01) |
| H02P 29/02 | (2006.01) |
| H02P 6/18 | (2006.01) |
| H02P 25/22 | (2006.01) |

(52) U.S. Cl.
CPC ............. *H02P 6/16* (2013.01); *H02P 29/022* (2013.01); *H02P 6/18* (2013.01); *H02P 25/22* (2013.01)
USPC ............. 318/400.09; 318/400.01; 318/700

(58) Field of Classification Search
CPC ........................................................ H02P 6/16
USPC ................. 318/400.09, 400.01, 700
See application file for complete search history.

(56) References Cited

U.S. PATENT DOCUMENTS

| | | | | |
|---|---|---|---|---|
| 6,191,550 | B1 * | 2/2001 | Yoshihara | 318/661 |
| 6,615,152 | B2 * | 9/2003 | Fujimoto et al. | 702/94 |
| 8,055,410 | B2 * | 11/2011 | Sakamaki et al. | 701/41 |
| 8,264,190 | B2 | 9/2012 | Suzuki | |
| 8,528,689 | B2 * | 9/2013 | Uryu | 180/446 |

(Continued)

FOREIGN PATENT DOCUMENTS

| | | |
|---|---|---|
| JP | 2006025587 A | 1/2006 |
| JP | 2010-29031 A | 2/2010 |

(Continued)

OTHER PUBLICATIONS

Yoshihiko Kinpara et al., "Position Sensorless Control of PM Motor Using Adaptive Observer on Rotational Coordinate", T. IEE Japan, May 2003, pp. 1-10, vol. 123-D, No. 5.

(Continued)

*Primary Examiner* — David S Luo
(74) *Attorney, Agent, or Firm* — Sughrue Mion, PLLC; Richard C. Turner

(57) ABSTRACT

Provided are rotational position detection means detecting the rotational position of a multiplex-winding rotary machine; failure determination means determining failure of the rotational position detection means; control means calculating a voltage instruction for each winding group, based on the rotational position detected by the rotational position detection means; and voltage application means applying voltage to each winding group, based on the voltage instruction. According to the failure determination by the failure determination means, the control means outputs a voltage instruction for rotational position estimation to the voltage application means, and estimates the rotational position $\theta e$, based on at least one of voltage and current obtained from the winding group in accordance with the voltage instruction.

16 Claims, 24 Drawing Sheets

(56) References Cited

U.S. PATENT DOCUMENTS

| | | |
|---|---|---|
| 2011/0074323 A1 | 3/2011 | Mukai |
| 2011/0156629 A1 | 6/2011 | Satou et al. |
| 2012/0049782 A1 | 3/2012 | Suzuki |
| 2013/0073252 A1 | 3/2013 | Yamasaki et al. |

FOREIGN PATENT DOCUMENTS

| | | |
|---|---|---|
| JP | 201029030 A | 2/2010 |
| JP | 2010041868 A | 2/2010 |
| JP | 2010-166638 A | 7/2010 |
| JP | 2011-78221 A | 4/2011 |
| JP | 2011-78230 A | 4/2011 |
| JP | 2011-131860 A | 7/2011 |
| JP | 2012050252 A | 3/2012 |
| WO | 2011162011 A1 | 12/2011 |

OTHER PUBLICATIONS

Masato Ito et al., "Direct Rotor-Position Estimation Method for Salient Pole PM Motor by Using High-Frequency Voltage", IEEJ Transactions on Industry Applications, Jun. 2011, pp. 785-792, vol. 131, No. 6.

Japanese Office Action, issue Oct. 8, 2013, Patent Application No. 2012-068570.

* cited by examiner

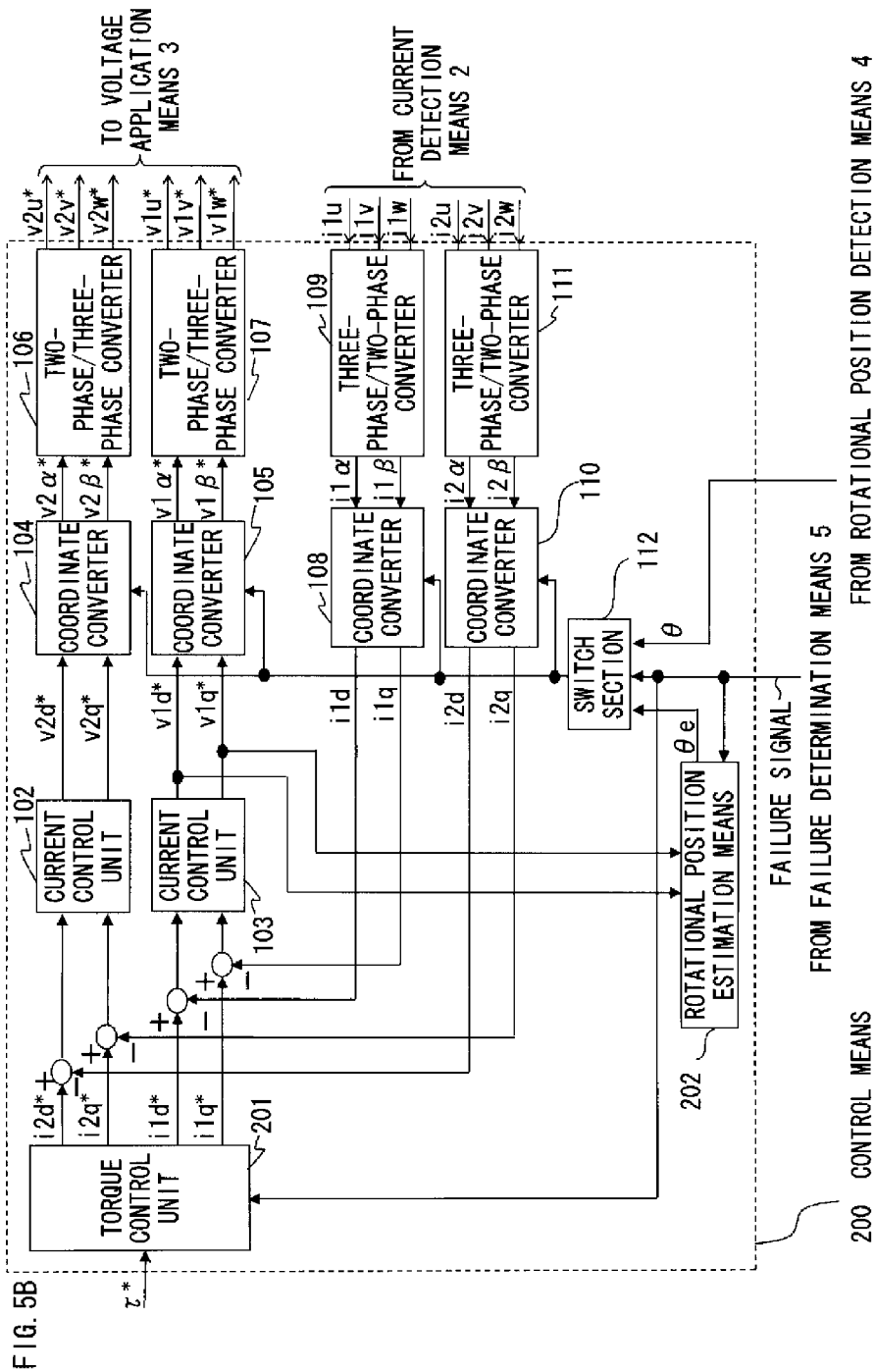

DRIVING APPARATUS FOR MULTIPLEX-WINDING ROTARY MACHINE

BACKGROUND OF THE INVENTION

1. Field of the Invention

The present invention relates to a driving apparatus for a multiplex-winding rotary machine, which is capable of continuing to drive the rotary machine even if rotational position detection means has failed.

2. Description of the Background Art

A driving apparatus for a rotary machine, in order to drive the rotary machine in a desired state, detects the position of a rotor of the rotary machine by a rotational position detector to perform control to generate a voltage instruction for voltage application to the rotary machine, and applies, to the rotary machine, voltage based on the voltage instruction by voltage application means, thereby driving the rotary machine.

The rotational position detector, current detection means, the voltage application means, a rotary machine winding, and the like composing the rotary machine driving apparatus can sometimes fail, and accordingly, various methods are proposed for continuing to drive the rotary machine even when failure occurs.

Patent Document 1 discloses that, in a rotary machine control apparatus for controlling a rotary machine having a rotor and a stator facing the rotor, a sensor failure determination section determines whether or not a resolver has failed. In normal state in which the resolver does not fail, the rotary machine is controlled by using a detection rotation angle detected by the resolver. If the resolver has failed, the rotary machine is controlled by using an estimation rotation angle obtained by a rotation angle estimation section.

Patent Document 2 discloses that, in a multiphase rotary machine having a plurality of winding groups each including windings for a plurality of phases, a plurality of inverter sections each having switching means corresponding to each phase of windings are provided for the respective winding groups. When OFF-failure occurs in which conduction of the switching means is not allowed, in the failed inverter section which includes the switching means that has failed, the switching means other than the switching means that has failed in the failed inverter section is controlled based on a failure phase current instruction value calculated as a function about the rotational position of the multiphase rotary machine and a torque instruction or a function about the rotational position and a q-axis current instruction value, and a normal inverter section other than the failed inverter section is controlled in the same manner as in normal state.

Patent Document 3 discloses that, in a multiphase rotary machine having a plurality of winding groups each including windings corresponding to a plurality of phases, inverter sections of a plurality of systems, each having a leg composed of a high-potential-side switching device and a low-potential-side switching device corresponding to each phase of the multiphase rotary machine, are provided for the respective winding groups. When short-circuit failure occurs in which the switching device keeps conductive state regardless of control to turn off the switching device, all the switching devices in the failed system are controlled to be OFF while the multiphase rotary machine continues to be driven by the leg in the system that does not fail, and the switching devices in the system that does not fail are controlled so as to cancel the output that is caused along with the short-circuit failure in the failed system and that operates against the drive of the multiphase rotary machine, or so as to reduce the influence of the output on the driving.

Patent Document 4 discloses an electric power steering apparatus which assists steering force of a driver by using driving force for a rotary machine, the electric power steering apparatus including: control means which sets a current instruction value needed for the driving force of the rotary machine; a plurality of power converters; a plurality of groups of windings, corresponding to the plurality of power converters, which generate the driving force of the rotary machine by being respectively supplied with current from the plurality of power converters; and failure detection means which detects failure of the power converter or the winding. When the failure detection means has detected failure, the current instruction value is reduced from that in normal state, and current is continuously supplied from the normal one of the power converters to the corresponding windings.

Patent Document 1: Japanese Laid-Open Patent Publication No. 2010-29031
Patent Document 2: Japanese Laid-Open Patent Publication No. 2011-78221
Patent Document 3: Japanese Laid-Open Patent Publication No. 2011-78230
Patent Document 4: Japanese Laid-Open Patent Publication No. 2011-131860

Patent Document 1 proposes a method for continuing to drive a rotary machine when a resolver has failed in the rotary machine. However, there is a problem that if rotational position detection means has failed in a multiplex-winding rotary machine, the rotation performance is decreased.

In Patent Documents 2 to 4, a multiplex-winding rotary machine having a plurality of winding groups each including windings for a plurality of phases, and a plurality of voltage application means for the respective winding groups, are provided, whereby, even if some of the rotary machine windings or the voltage application means have failed, the rotary machine can continue to be driven by the other normal rotary machine windings and voltage application means. However, there is a problem that if rotational position detection means has failed, it is impossible to appropriately cope with the failure.

SUMMARY OF THE INVENTION

The present invention has been made to solve the above problem, and an object of the present invention is to, in a driving apparatus for a multiplex-winding rotary machine having a plurality of winding groups each including windings for a plurality of phases, enable the driving to be continued while keeping minimum rotation performance, even when rotational position detection means has failed.

A driving apparatus for a multiplex-winding rotary machine according to the present invention includes: a multiplex-winding rotary machine having a plurality of winding groups each including windings for a plurality of phases; rotational position detection means which detects the rotational position of the multiplex-winding rotary machine; failure determination means which determines whether or not the rotational position detection means has failed; control means which calculates a voltage instruction with respect to the plurality of winding groups, based on the rotational position detected by the rotational position detection means; and a plurality of voltage application means which apply voltage to the plurality of winding groups, based on the voltage instruction. The control means, when the failure determination means has determined that the rotational position detection means has failed, outputs a voltage instruction for rotational position estimation to the voltage application means corresponding to at least one of the plurality of winding groups, and estimates the rotational position, based on at least one of voltage and current obtained from the winding group in accordance with the voltage instruction.

According to the present invention, in the driving apparatus for a multiplex-winding rotary machine having a plurality of winding groups each including windings for a plurality of phases, when the rotational position detection means has failed, a voltage instruction for position estimation is outputted to the voltage application means corresponding to at least one of the plurality of winding groups, and the rotational position is estimated based on at least one of voltage and current obtained from the winding group in accordance with the voltage instruction, thus providing significant effect of enabling the driving to be continued while keeping minimum rotation performance, even when the rotational position detection means has failed.

The foregoing and other objects, features, aspects and advantages of the present invention will become more apparent from the following detailed description when read in conjunction with the accompanying drawings.

BRIEF DESCRIPTION OF THE DRAWINGS

FIGS. 5A-5B are configuration diagrams of a driving apparatus for a multiplex-winding rotary machine according to the second embodiment of the present invention;

DETAILED DESCRIPTION OF THE PREFERRED EMBODIMENTS OF THE INVENTION

First Embodiment

Figure 1A:
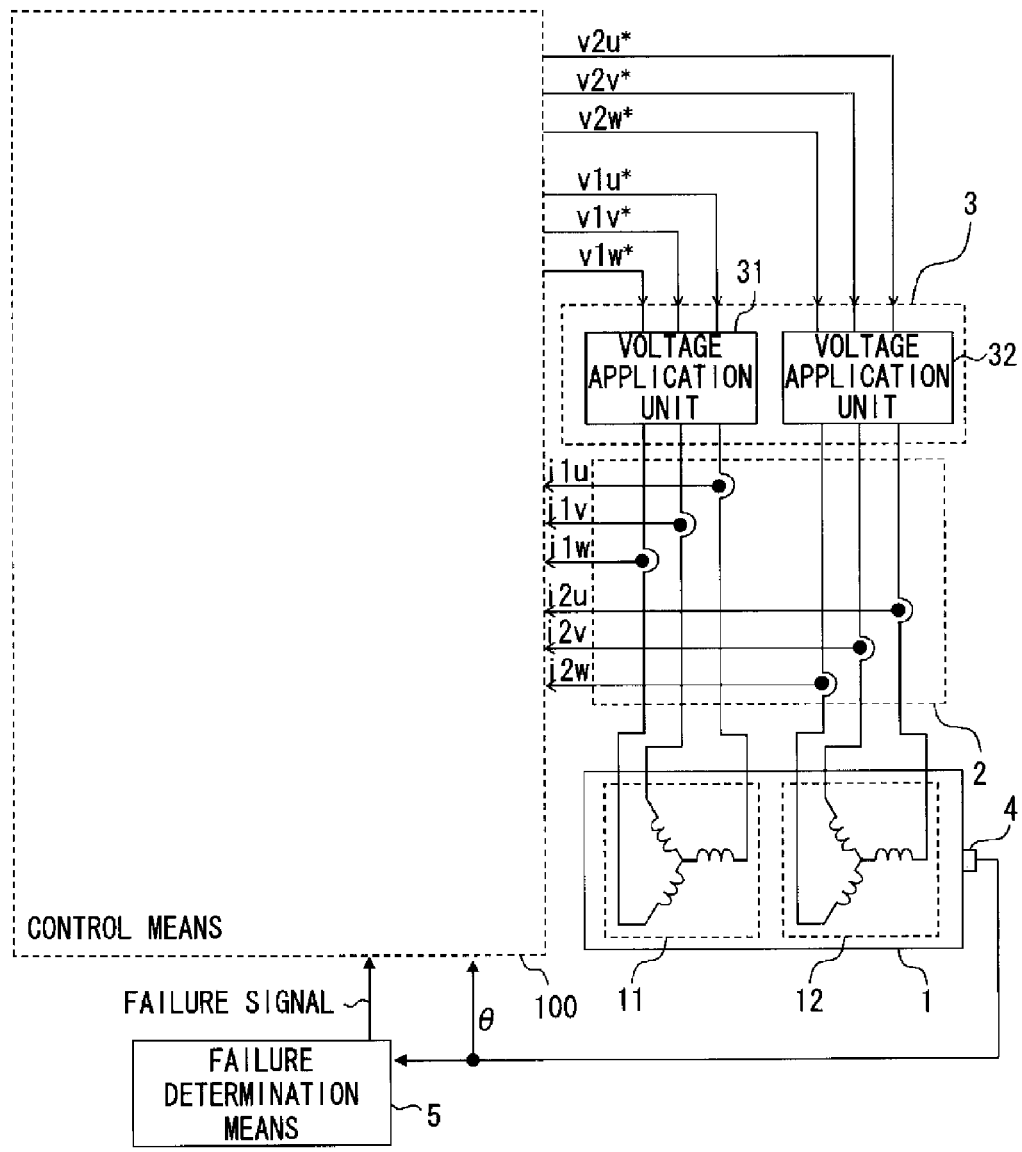
FIGS. 1A-1B are configuration diagrams of a driving apparatus for a multiplex-winding rotary machine according to the first embodiment of the present invention.
Figure 1B:
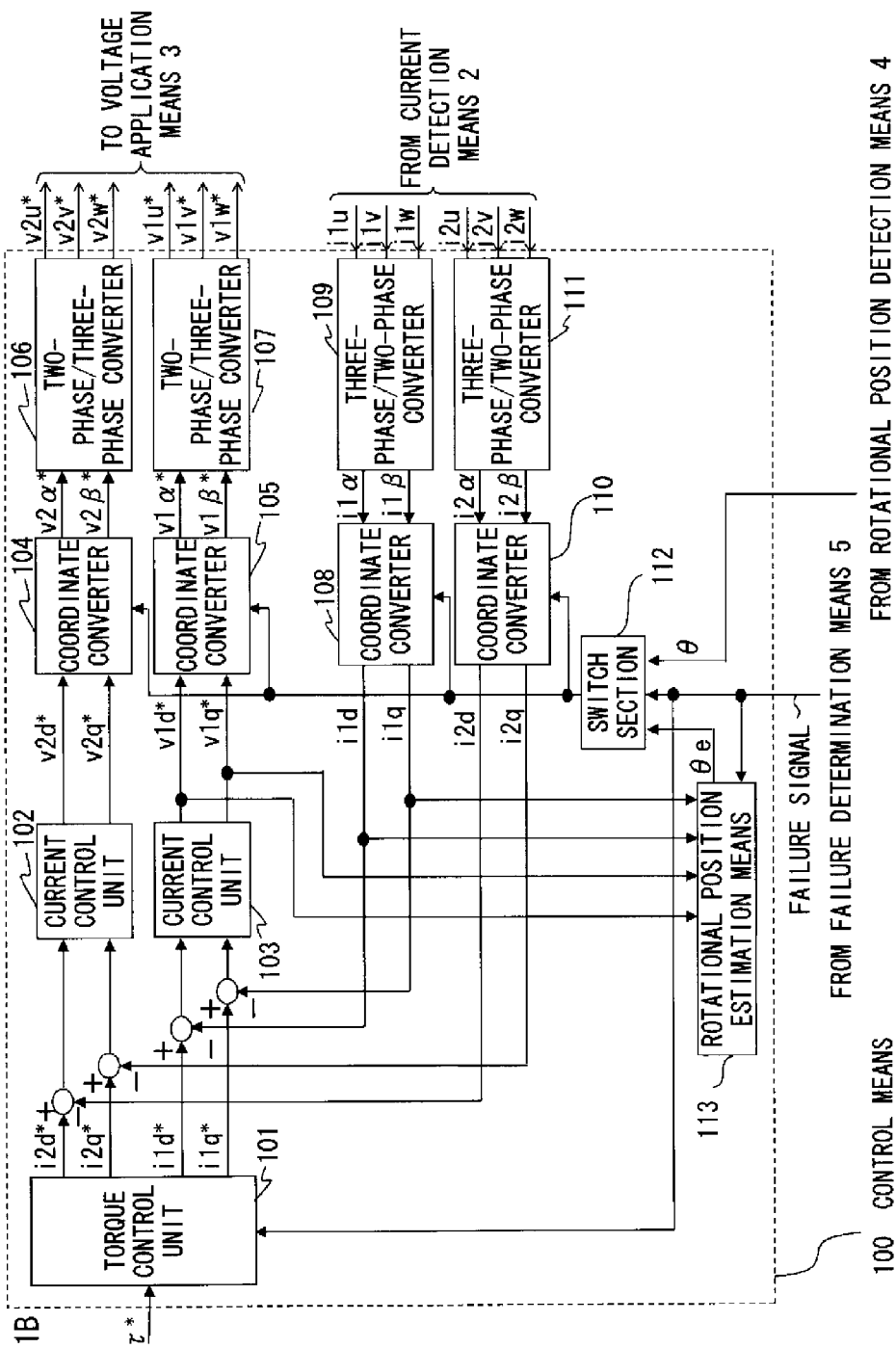

FIGS. 1A and 1B are configuration diagrams of a driving apparatus for a multiplex-winding rotary machine according to the first embodiment of the present invention.

In the first embodiment, a multiplex-winding rotary machine 1 (hereinafter, may be simply referred to as a rotary machine 1) is a synchronous rotary machine having a first winding group 11 composed of three-phase windings and a second winding group 12 composed of three-phase windings provided for a stator, and using permanent magnet for a rotor.

Voltage application means 3 is connected to the rotary machine 1 via current detection means 2. The voltage application means 3 is composed of voltage application units 31 and 32 individually provided for the respective winding groups 11 and 12. In addition, rotational position detection means 4 is provided for a rotary machine 1 and detects the rotational position thereof. In addition, failure determination means 5 which determines failure of the rotational position detection means 4 is provided.

In the rotary machine 1, voltage is applied to the first winding group 11 by one voltage application unit 31, whereby current is applied to each winding in the first winding group 11, and similarly, voltage is applied to the second winding group 12 by the other voltage application unit 32, whereby current is applied to each winding in the second winding group 12. Thus, the rotary machine 1 rotates by electromagnetic force due to the current applied to each of the winding groups 11 and 12 and the permanent magnet of the rotor.

The current detection means 2 detects rotary machine currents i1u, i1v, i1w, i2u, i2v, and i2w. The voltage application means 3 supplies voltage to the rotary machine 1, based on voltage instructions v1u*, v1v*, v1w*, v2u*, v2v*, and v2w*, by a power conversion apparatus such as an inverter.

The rotational position detection means 4 detects a rotational position $\theta$ of the rotary machine 1, by a rotational position detection apparatus such as a resolver or a rotary encoder. The failure determination means 5 determines failure of the rotational position detection means 4, and when the rotational position detection means 4 has failed, outputs a failure signal. As a failure determination method, for example, a method disclosed in Japanese Laid-Open Patent Publication No. 2010-29031, or another known method is used to detect failure of the rotational position detection means.

Next, control means 100 will be described.

The control means 100 outputs a voltage instruction to the voltage application means 3. A torque control unit 101 generates current instruction values i1d*, i1q*, i2d*, and i2q* in a rotational coordinate system synchronized with the rotational position θ of the rotary machine 1, in accordance with a desired driving condition of the rotary machine 1 such as rotation rate or torque, here, from a torque instruction τ*. The detail of calculation by the torque control unit 101 will be described later.

A three-phase/two-phase converter 109 converts the currents i1u, i1v, and i1w flowing in the first winding group 11 of the rotary machine 1, to current values i1α and i1β in a two-axis coordinate system at rest. Similarly, a three-phase/two-phase converter 111 converts the currents i2u, i2v, and i2w flowing in the second winding group 12 of the rotary machine 1, to current values i2α and i2β in a two-axis coordinate system at rest.

One coordinate converter 108 converts the current values i1α and i1β in a two-axis coordinate system at rest, to current values i1d and i1q in a rotational coordinate system. Similarly, the other coordinate converter 110 converts the current values i2α and i2β in a two-axis coordinate system at rest, to current values i2d and i2q in a rotational coordinate system.

A current control unit 103 performs, for example, proportional integral control for the difference between the D-axis current instruction value i1d* and the D-axis current i1d, and the difference between the Q-axis current instruction value i1q* and the Q-axis current i1q, with respect to the first winding group 11, thereby calculating a D-axis voltage instruction v1d* and a Q-axis voltage instruction v1q*. Similarly, a current control unit 102 performs, for example, proportional integral control for the difference between the D-axis current instruction value i2d* and the D-axis current i2d, and the difference between the Q-axis current instruction value i2q* and the Q-axis current i2q, with respect to the second winding group 12, thereby calculating the D-axis voltage instruction v2d* and the Q-axis voltage instruction v2q*.

One coordinate converter 105 converts the voltage instructions v1d* and v1q* in a rotational coordinate system, to voltage instructions v1α* and v1β* in a two-axis coordinate system at rest. Similarly, the other coordinate converter 104 converts the voltage instructions v2d* and v2q* in a rotational coordinate system, to voltage instructions v2α* and v2β* in a two-axis coordinate system at rest.

A two-phase/three-phase converter 107 converts the voltage instructions v1α* and v1β* in a two-axis coordinate system at rest, to the voltage instructions v1u*, v1v*, and v1w* for the respective phases. Similarly, a two-phase/three-phase converter 106 converts the voltage instructions v2α* and v2β* in a two-axis coordinate system at rest, to the voltage instructions v2u*, v2v*, and v2w* for the respective phases.

Rotational position estimation means 113, when the failure determination means 5 has outputted a failure signal, estimates a rotational position, based on the voltage instructions v1d* and v1q* in a rotational two-axis coordinate system with respect to the first winding group 11 outputted from the current control unit 103, and the currents i1d and i1q in a rotational two-axis coordinate system outputted from the coordinate converter 108. The rotational position estimated in this case is denoted by θe. It is noted that as the estimation method, various methods of estimating a rotational position based on voltage/current equations for the rotary machine, such as a method disclosed in the May 2003 issue of the transactions of the Institute of Electrical Engineers of Japan, D, "Position Sensorless Control of PM Motor Using Adaptive Observer on Rotational Coordinate" (hereinafter, referred to as Non-Patent Document 1), or a method disclosed in Patent Document 1 described above, may be used.

A switch section 112 selects the rotational position θ or θe to be outputted to each of the coordinate converters 108, 110, 104, and 105, based on a failure signal from the failure determination means 5. When the failure determination means 5 does not output a failure signal, the rotational position θ detected by the rotational position detection means 4 is selected, and when the failure determination means 5 has outputted a failure signal, the rotational position θe estimated by the rotational position estimation means 113 is selected. Then, information about the rotational position θ or θe is given to each of the coordinate converters 104, 105, 108, and 110.

The torque control unit 101 calculates current instruction values i1d*, i1q*, i2d*, and i2q* which differ between when a failure signal is inputted from the failure determination means 5 and when a failure signal is not inputted, with respect to the same torque instruction τ*.

That is, when a failure signal is not inputted, the torque control unit 101 sets the current instruction values such that i1d* is equal to i2d* and i1q* is equal to i2q as shown in the following expressions (1) and (2).

Figure 2:
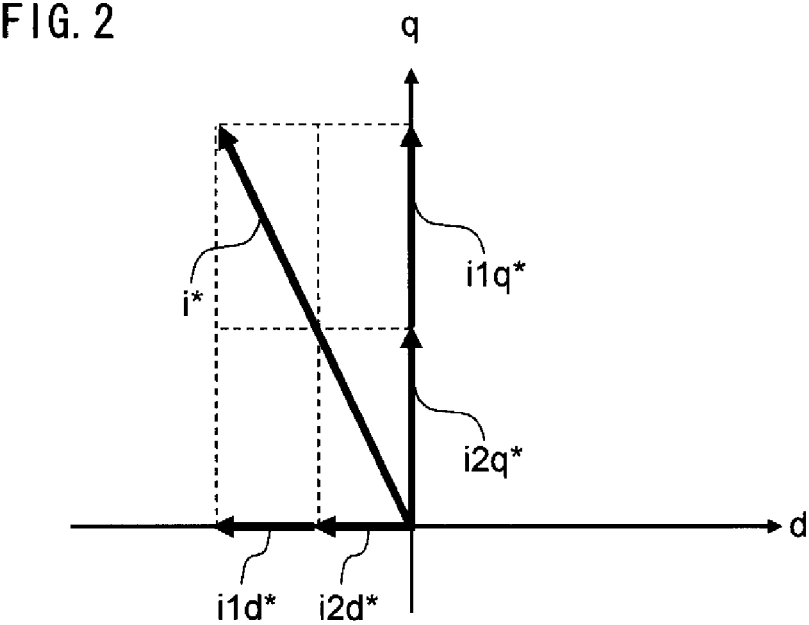
FIG. 2 is an explanation diagram showing the operation of a current instruction vector according to the first embodiment of the present invention.

FIG. 2 shows vector representation in a rotational coordinate system in this case, and i* is a value obtained by vector addition of the current instruction values for the first winding group 11 and the second winding group 12.

$$i1d^* = i2d^* \quad (1)$$

$$i1q^* = i2q^* \quad (2)$$

On the other hand, when a failure signal is inputted, the torque control unit 101 sets the current instruction values so as to satisfy the relationships shown in the following expressions (3) and (4). That is, the absolute values of the current instruction values with respect to a winding group by which the rotational position is estimated (in this example, the first winding group 11) is set to be small.

Figure 3:
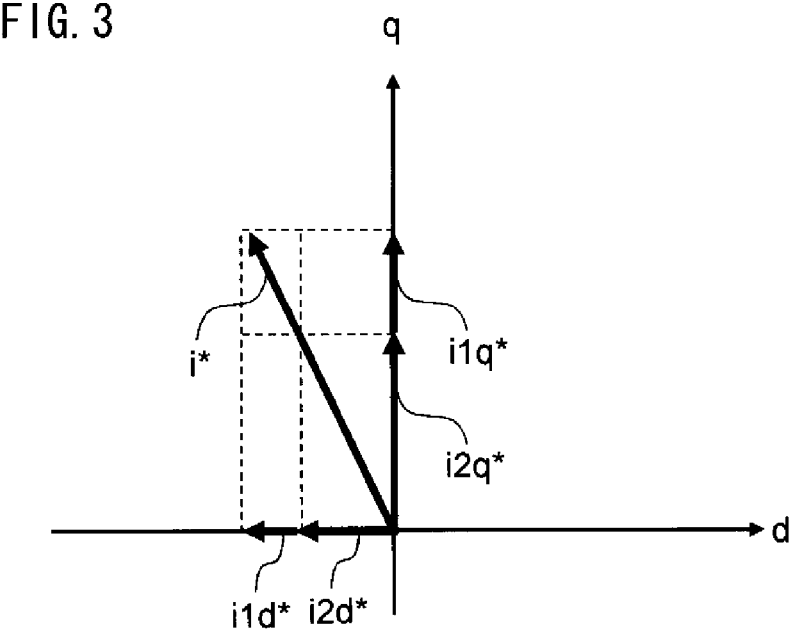
FIG. 3 is an explanation diagram showing the operation of a current instruction vector according to the first embodiment of the present invention.

FIG. 3 shows vector representation in a rotational coordinate system in this case. As compared with the current instruction values shown in FIG. 2, the current instruction values i2d* and i2q* for the second winding group 12 are the same value, and the current instruction values i1d* and i1q* for the first winding group 11 are set to be small.

$$|i1d^*| < |i2d^*| \quad (3)$$

$$|i1q^*| < |i2q^*| \quad (4)$$

In addition, as shown in the following expressions (5) and (6), between the first winding group 11 and the second winding group 12, the current instruction values with respect to the D-axis may be the same, and only the current instruction value with respect to the Q-axis may be smaller than the other one.

$$|i1d^*| = |i2d^*| \quad (5)$$

$$|i1q^*| < |i2q^*| \quad (6)$$

Further, as shown in the following expressions (7) and (8), between the first winding group 11 and the second winding group 12, the current instruction values with respect to the Q-axis may be the same, and only the current instruction value with respect to the D-axis may be smaller than the other one.

$$|i1d^*|<|i2d^*| \quad (7)$$

$$|i1q^*|=|i2q^*| \quad (8)$$

Figure 4:
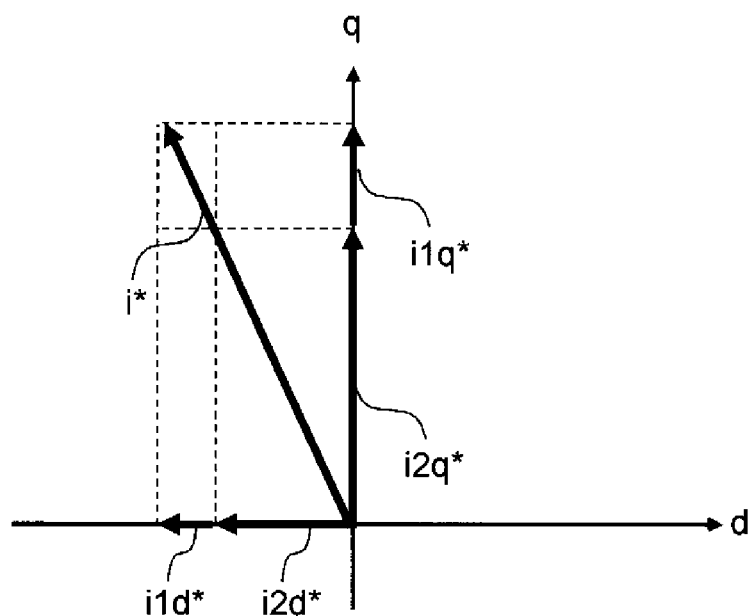
FIG. 4 is an explanation diagram showing the operation of a current instruction vector according to the first embodiment of the present invention.

Further, as compared with FIG. 2, the current instruction value i1d* may be decreased while the current instruction value i2d* may be increased by the decreased amount, and the current instruction value i1q* may be decreased while the current instruction value i2q* may be increased by the decreased amount, whereby the same vector addition value i* may be obtained. FIG. 4 is a vector diagram in the case where the current instruction values i1d*, i2d*, i1q*, and i2q* are set in this way. If the current instruction values are set as shown in FIG. 4, since the vector addition value i* is the same as the value before failure of the rotational position detection means 4, it is possible to continue the driving at the same rotation torque.

Hereinafter, the reason why the current instruction values with respect to the winding group by which the rotational position is estimated (in this example, the first winding group 11) are set to be small as shown by the above expressions (3) to (8) or in FIG. 4, will be described.

In the position estimation method for the rotational position θe by the rotational position estimation means 113, the rotational position θe is estimated from induced voltage of the rotary machine 1, based on voltage/current equations of the rotary machine 1 as shown in the following expressions (9) and (10).

$$Vd=R \cdot id+Ld \cdot pid-\omega \cdot Lq \cdot iq \quad (9)$$

$$Vq=R \cdot iq+Lq \cdot piq+\omega \cdot Ld \cdot id+\omega \phi \quad (10)$$

Here, Vd is d-axis voltage, Vq is q-axis voltage, id is d-axis current, iq is q-axis current, R is winding resistance, Ld is d-axis inductance, Lq is q-axis inductance, ω is the rotation angle velocity of the rotary machine, φ is the magnet flux of the rotary machine, and p is a differential operator.

Therefore, the winding resistance and the inductance of the rotary machine 1 affect the rotational position estimation accuracy. That is, if the actual winding resistance and the actual inductance of the rotary machine 1 differ from the winding resistance and the inductance used for the rotational position estimation means 113 to estimate the rotational position θe, the induced voltage cannot be accurately extracted from the voltage and current of the rotary machine 1, and as a result, estimation error of the rotational position θe occurs.

Here, since the winding resistance varies in accordance with the winding temperature, and the inductance varies in accordance with the winding current value by the effect of magnetic saturation, it is not easy to maintain the rotational position estimation accuracy in spite of the variations. Although various correction methods are proposed for the problem, the correction accuracy can be insufficient, or an expensive microcontroller as a control operation apparatus can be needed because a complicated table is needed for improving the estimation accuracy.

Accordingly, in the first embodiment, when a failure signal is outputted from the failure determination means 5, the torque control unit 101 sets the absolute values of the current instruction values i1d* and i1q* with respect to the first winding group 11 by which the rotational position is estimated, to be smaller than those when a failure signal is not outputted.

The currents i1d and i1q in a rotational two-axis coordinate system that are detected are controlled by the current control unit 103 so as to coincide with the current instruction values i1d* and i1q*, and at this time, in accordance with a failure signal from the failure determination means 5, the voltage instructions v1d* and v1q* to be outputted with respect to the first winding group 11 are set to be smaller than those when a failure signal is not inputted, whereby the voltage instructions control the current applied to the first winding group 11 so as to be small.

Here, as shown in expressions (9) and (10) which are voltage equations, the terms that include the winding resistance R and the inductances Ld and Lq are multiplied by the currents id and iq or the differential values pid and piq of the currents. Therefore, if the current instruction values for the currents applied to the winding group by which the rotational position θe is estimated is set to be small, the voltage values of the terms that include the winding resistance R and the inductances Ld and Lq can be decreased. Particularly, in expression (10), since the first to third terms of the right-hand side are decreased and the proportion of the fourth term (induced voltage term: ωφ) of the right-hand side in the left-hand side Vg is relatively increased, the influence of error of the winding resistance or the inductance can be decreased. For the above reason, even if error occurs in the winding resistance or the inductance, decrease in the estimation accuracy for the rotational position θe can be suppressed.

As described above, according to the first embodiment, when the rotational position detection means 4 has failed, the control means 100 outputs voltage instructions to decrease the current of the winding group by which the rotational position θe is estimated (here, the first winding group 11 as an example). Thus, when the rotational position detection means 4 has failed, even if error occurs in the winding resistance or the inductance, it becomes possible to smoothly continue the driving while estimating the rotational position θe with high accuracy, without newly providing a complicated correction table, as compared with the method described in Non-Patent Document 1 or Patent Document 1.

Second Embodiment

Figure 5A:
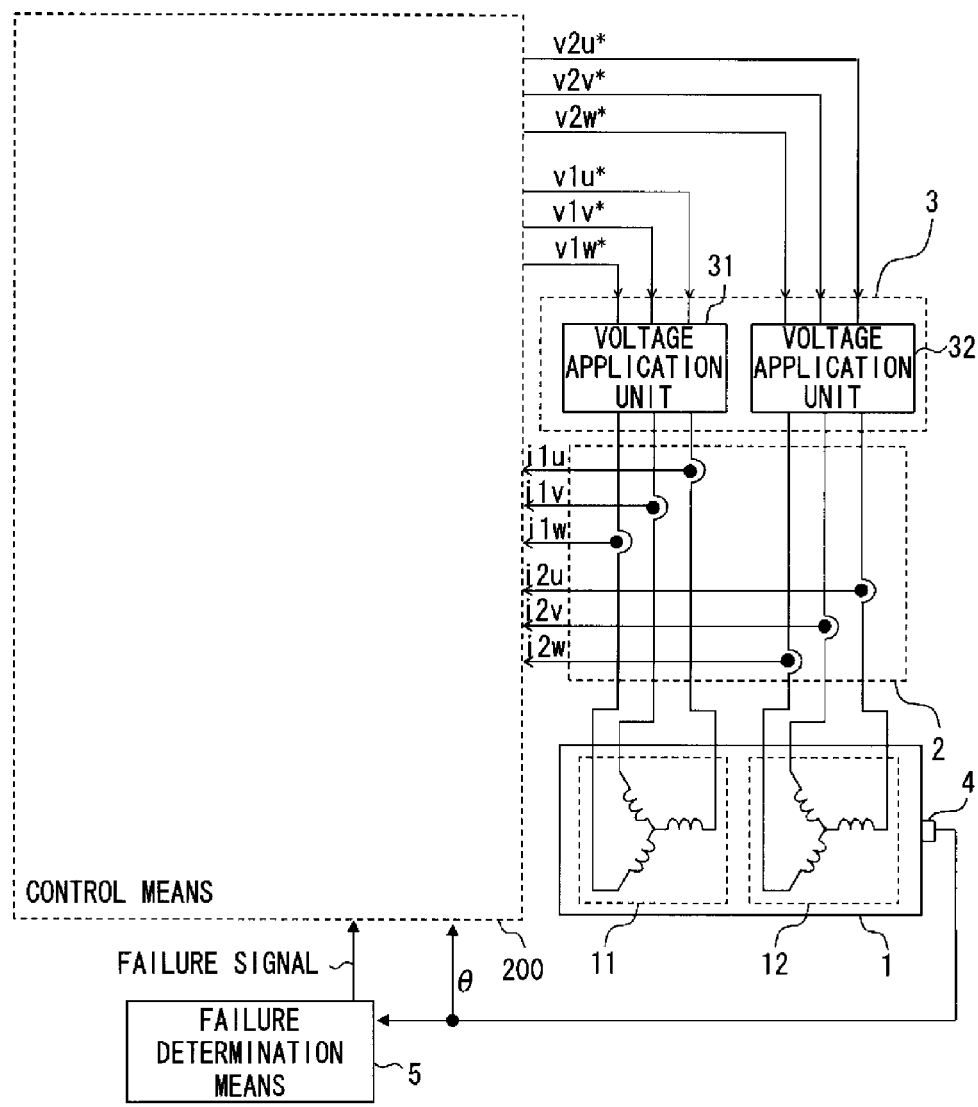

FIGS. 5A and 5B are configuration diagrams of a driving apparatus for a multiplex-winding rotary machine according to the second embodiment of the present invention.

In the second embodiment, the different parts from the first embodiment (FIGS. 1A and 1B) are a torque control unit 201 and rotational position estimation means 202 of control means 200. The other configurations are basically the same as those of the first embodiment.

The torque control unit 201 calculates the current instruction values i1d*, i1q*, i2d*, and i2q* which differ between when a failure signal is inputted from the failure determination means 5 and when a failure signal is not inputted, with respect to the same torque instruction τ*.

That is, when a failure signal is not inputted, the torque control unit 201 sets the current instruction values as shown in the above expressions (1) and (2), similarly to the torque control unit 101 of the first embodiment.

On the other hand, when a failure signal is inputted, the torque control unit 201 sets the current instruction values so as to satisfy the relationships shown by the following expressions (11) and (12). That is, the current instruction values i1d* and i1q* with respect to the first winding group 11 by which the position estimation is performed are both set at zero. FIG.

6 shows vector representation in a rotational coordinate system in this case.

$$i1d^* = 0 \quad (11)$$

$$i1q^* = 0 \quad (12)$$

Figure 6:
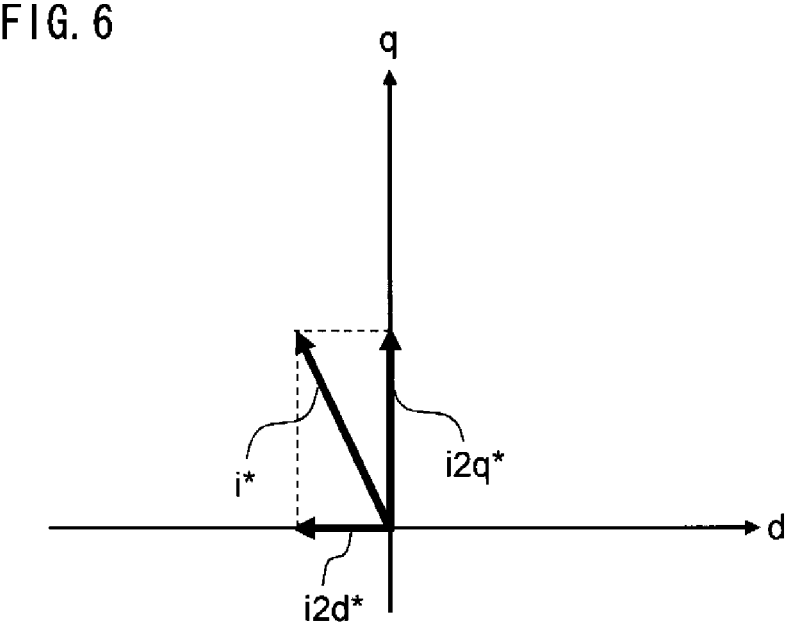
FIG. 6 is an explanation diagram showing the operation of a current instruction vector according to the second embodiment of the present invention.
Figure 7:
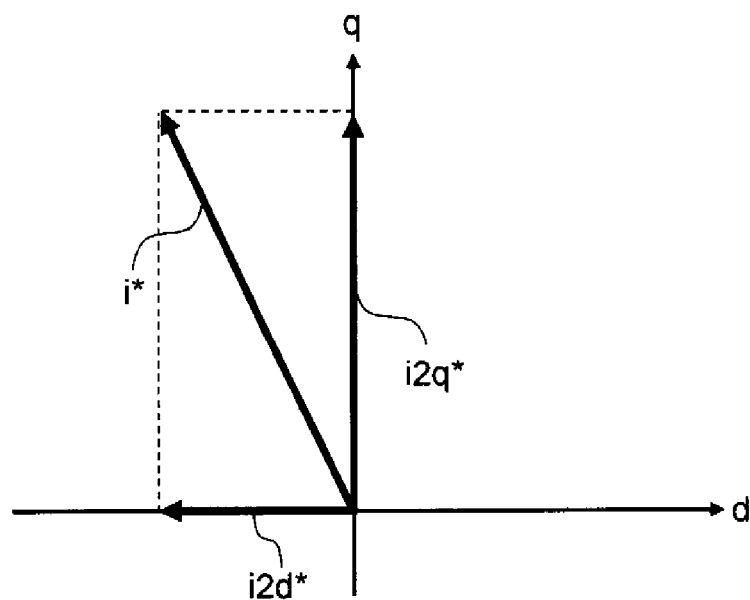
FIG. 7 is an explanation diagram showing the operation of a current instruction vector according to the second embodiment of the present invention.

Alternatively, as compared with FIG. 6, the current instruction value i1d* may be set at zero while the current instruction value i2d* may be increased by the same value as the original current instruction value i1d*, and the current instruction value i1q* may be set at zero while the current instruction value i2q* may be increased by the same value as the original current instruction value i1q*, whereby the same vector addition value i* may be obtained. FIG. 7 is a vector diagram in the case where the current instruction values i1d* (=0), i2d*, i1q* (=0), and i2q* are set in this way. If the current instruction values are set as shown in FIG. 7, since the vector addition value i* is the same as the value before failure of the rotational position detection means 4, it is possible to continue the driving at the same rotation torque.

When the failure determination means 5 has outputted a failure signal, the rotational position estimation means 202 estimates the rotational position θe, based on the voltage instructions v1d* and v1q* with respect to the first winding group 11 outputted from the current control unit 103. Then, information about the estimated rotational position θe is given to each of the coordinate converters 104, 105, 108, and 110 via the switch section 112.

It is noted that as the estimation method in this case, the same method as that by the rotational position estimation means 113 of the first embodiment may be used. However, in the case where the rotational position estimation means 202 performs rotational position estimation, the torque control unit 201 sets the current instruction values i1d* and i1q* with respect to the first winding group 11 at zero. Therefore, since the current with respect to the first winding group 11 is controlled to be zero by the current control unit 103, information about the currents i1d and i1q with respect to the first winding group 11 is not needed to estimate the rotational position, unlike the case of the rotational position estimation means 113.

Hereinafter, the effect obtained by the torque control unit 201 setting both current instruction values i1d* and i1q* with respect to the first winding group 11 at zero will be described.

If the current instruction values i1d* and i1q* with respect to the first winding group 11 are both set at zero, the currents i1d and i1q of the first winding group 11 is controlled to be zero by the current control unit 103. Here, as shown in expressions (9) and (10) which are voltage equations, the terms that include the winding resistance R and the inductances Ld and Lq are multiplied by the currents id and iq or the differential values pid and piq of the currents. Therefore, if the current instruction values for the currents applied to the winding group are set at zero, the voltage values of the terms that include the winding resistance R and the inductances Ld and Lq become zero. As a result, particularly, in expression (10), since the first to third terms of the right-hand side become zero and the left-hand side Vq becomes equal to the fourth term (induced voltage term: $\omega\phi$) of the right-hand side, the influence of error of the winding resistance or the inductance can be eliminated. For the above reason, even if error occurs in the winding resistance or the inductance, decrease in the rotational position estimation accuracy can be suppressed more than in the first embodiment.

That is, when a failure signal is inputted from the failure determination means 5, the torque control unit 201 of the control means 200 sets both current instruction values i1d* and i1q* with respect to the first winding group 11 at zero, and along with the setting, the currents i1d and i1q with respect to the first winding group 11 are both controlled to be zero by the current control unit 103. Therefore, Vq in expression (10) is calculated based on only the induced voltage term $\omega\phi$, by the rotational position estimation means 202, so that the calculation is not affected by error in the resistance or the inductance. As a result, it becomes possible to accurately estimate the rotational position θe.

As described above, according to the second embodiment, when the rotational position detection means 4 has failed, the control means 200 outputs voltage such that the current of the winding group by which the rotational position θe is estimated is controlled to be zero. Thus, when the rotational position detection means 4 has failed, even if error occurs in the winding resistance or the inductance, it becomes possible to smoothly continue the driving while estimating the rotational position θe by the rotational position estimation means 202 with higher accuracy than in the first embodiment.

Third Embodiment

Figure 8A:
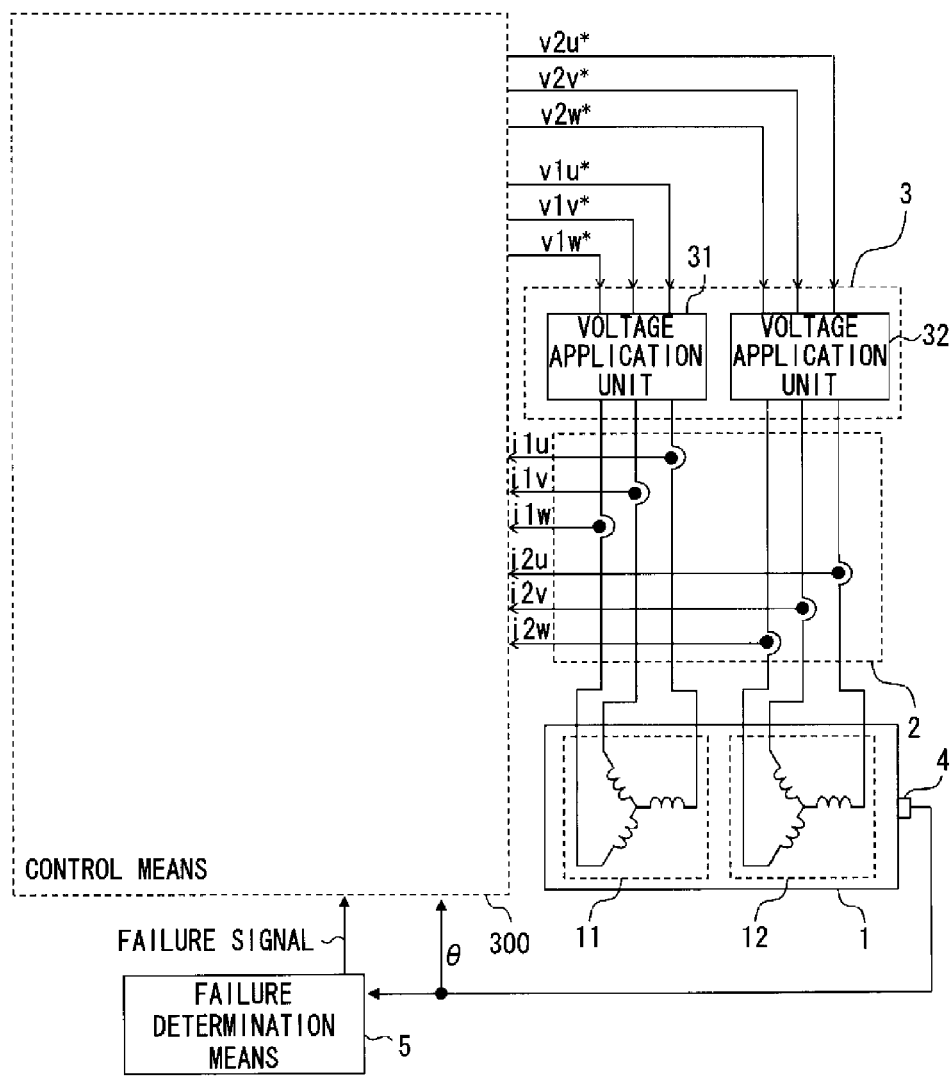
FIGS. 8A-8B are configuration diagrams of a driving apparatus for a multiplex-winding rotary machine according to the third embodiment of the present invention.
Figure 8B:
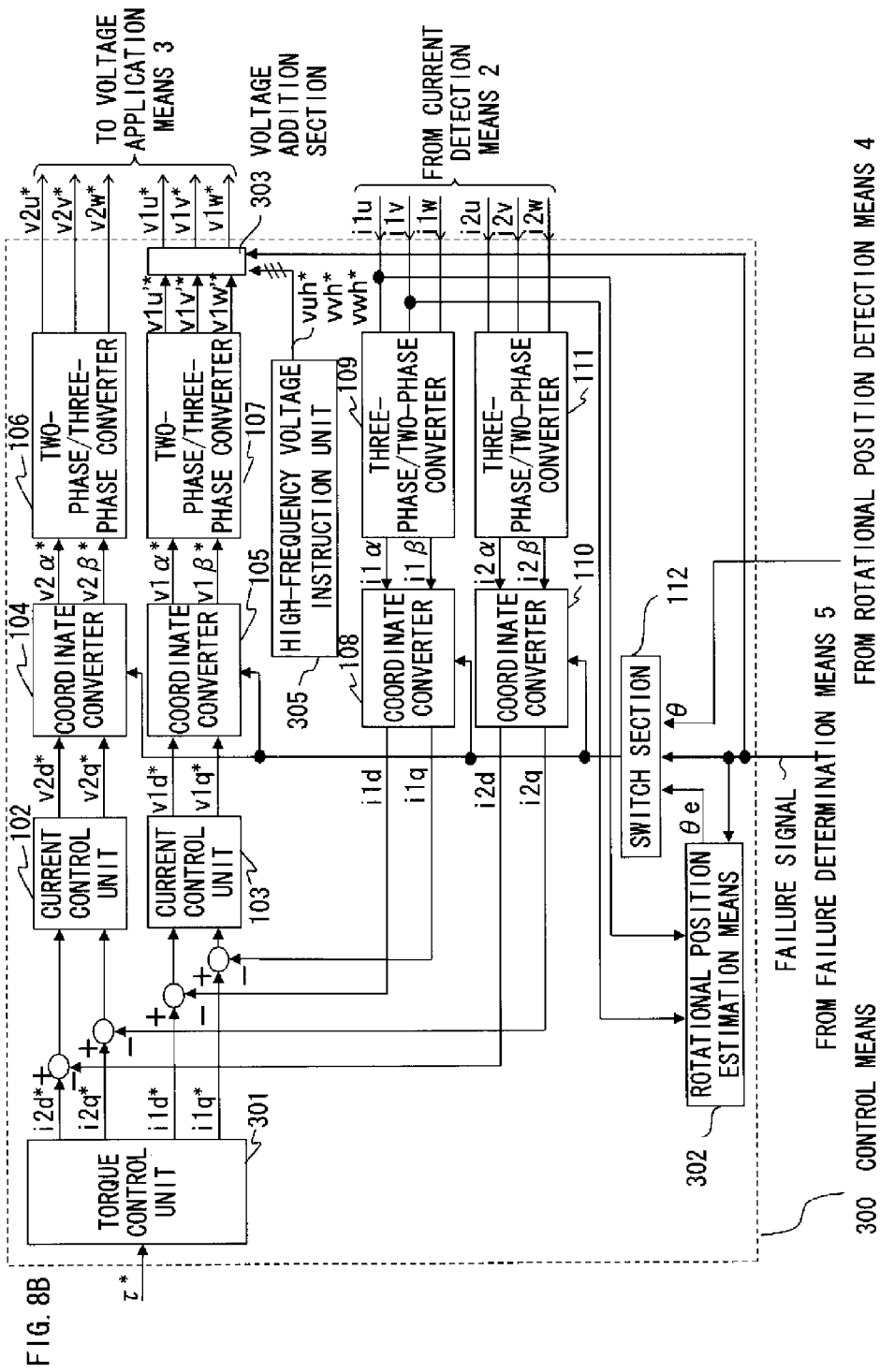

FIGS. 8A and 8B are configuration diagrams of a driving apparatus for a multiplex-winding rotary machine according to the third embodiment of the present invention.

In the third embodiment, the different parts from the first and second embodiments (FIGS. 1A and 1B, and FIGS. 5A and 5B) are a torque control unit 301, rotational position estimation means 302, a high-frequency voltage instruction unit 305, and a voltage addition section 303 of control means 300. The other configurations are basically the same as those of the first and second embodiments.

The torque control unit 301 generates the current instruction values i1d*, i1q*, i2d*, and i2q* in a rotational coordinate system synchronized with the rotational position θ of the rotary machine 1, in accordance with a desired driving condition of the rotary machine 1 such as rotation rate or torque, here, from the torque instruction τ*.

The high-frequency voltage instruction unit 305 generates high-frequency voltage instructions vuh*, vvh*, and vwh* for rotational position estimation. In addition, the voltage addition section 303 is provided at the subsequent stage of the two-phase/three-phase converter 107, and outputs the voltage instructions v1u*, v1v*, and v1w* which differ between when a failure signal is inputted from the failure determination means 5 and when a failure signal is not inputted.

That is, when a failure signal is not inputted, the voltage addition section 303 directly outputs values v1u'*, v1v'*, and v1w'* outputted from the two-phase/three-phase converter 107, as the voltage instructions v1u*, v1v*, and v1w*.

On the other hand, when a failure signal is inputted, the voltage addition section 303 adds the high-frequency voltage instructions vuh*, vvh*, and vwh* for rotational position estimation given from the high-frequency voltage instruction unit 305, to the values v1u'*, v1v'*, and v1w'* outputted from the two-phase/three-phase converter 107, and outputs the resultant values as the voltage instructions v1u*, v1v*, and v1w*. These relationships are shown by the following expressions (13) to (15).

$$vuh^* = v1u'^* + vuh^* \quad (13)$$

$$vvh^* = v1v'^* + vvh^* \quad (14)$$

$$vwh^* = v1w'^* + vwh^* \quad (15)$$

The rotational position estimation means 302, when the failure determination means 5 has outputted a failure signal, estimates the rotational position θe, based on the current of the first winding group 11 detected by the current detection means 2. It is noted that although FIGS. 8A and 8B show the case where, of the three-phase currents of the first winding group 11, the currents i1u and i1v for two phases, i.e., U-phase and V-phase are detected, the present invention is not limited thereto, and currents for two or more phases of the three phases may be detected. In addition, as the estimation method for the rotational position θe in this case, a known method to estimate the rotational position θe by using saliency of a rotor and applying high-frequency voltage besides a voltage instruction for driving a rotary machine, may be used. For example, a method disclosed in the June 2011 issue of the transactions of the Institute of Electrical Engineers of Japan, D, "Direct Rotor-Position Estimation Method for Salient Pole PM Motor by Using High-Frequency Voltage" (hereinafter, referred to as Non-Patent Document 2), may be used.

As described above, according to the third embodiment, when the rotational position detection means 4 has failed, the voltage instructions v1u*, v1v*, and v1w* of the rotary machine 1 which have been added by the high-frequency voltage instructions vuh*, vvh*, and vwh* for rotational position estimation are used, and the rotational position θe is estimated by using saliency of the rotary machine 1, whereby the rotary machine 1 can continue to be driven. Therefore, the rotational position θe can be estimated even in the case of low rotation rate in which the induced voltage decreases. Accordingly, even if the rotational position detection means 4 has failed when the rotation rate of the rotary machine 1 is low, it becomes possible to smoothly continue the driving while estimating the rotational position θe, as compared with Patent Document 1 and the first and second embodiments, which employ a method of estimating the rotational position based on the induced voltage of the rotary machine 1.

Fourth Embodiment

Figure 9A:
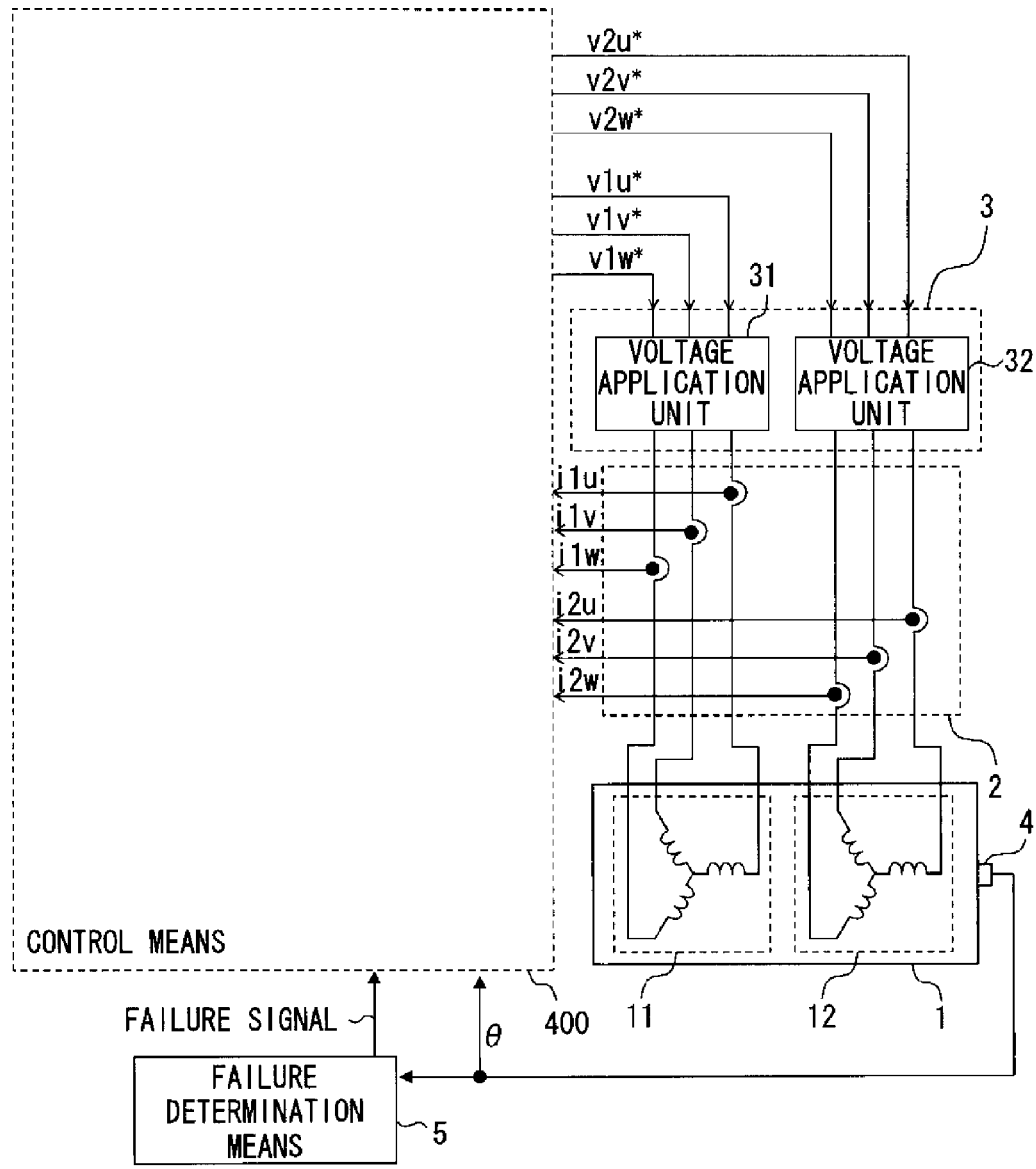
FIGS. 9A-9B are configuration diagrams of a driving apparatus for a multiplex-winding rotary machine according to the fourth embodiment of the present invention.
Figure 9B:
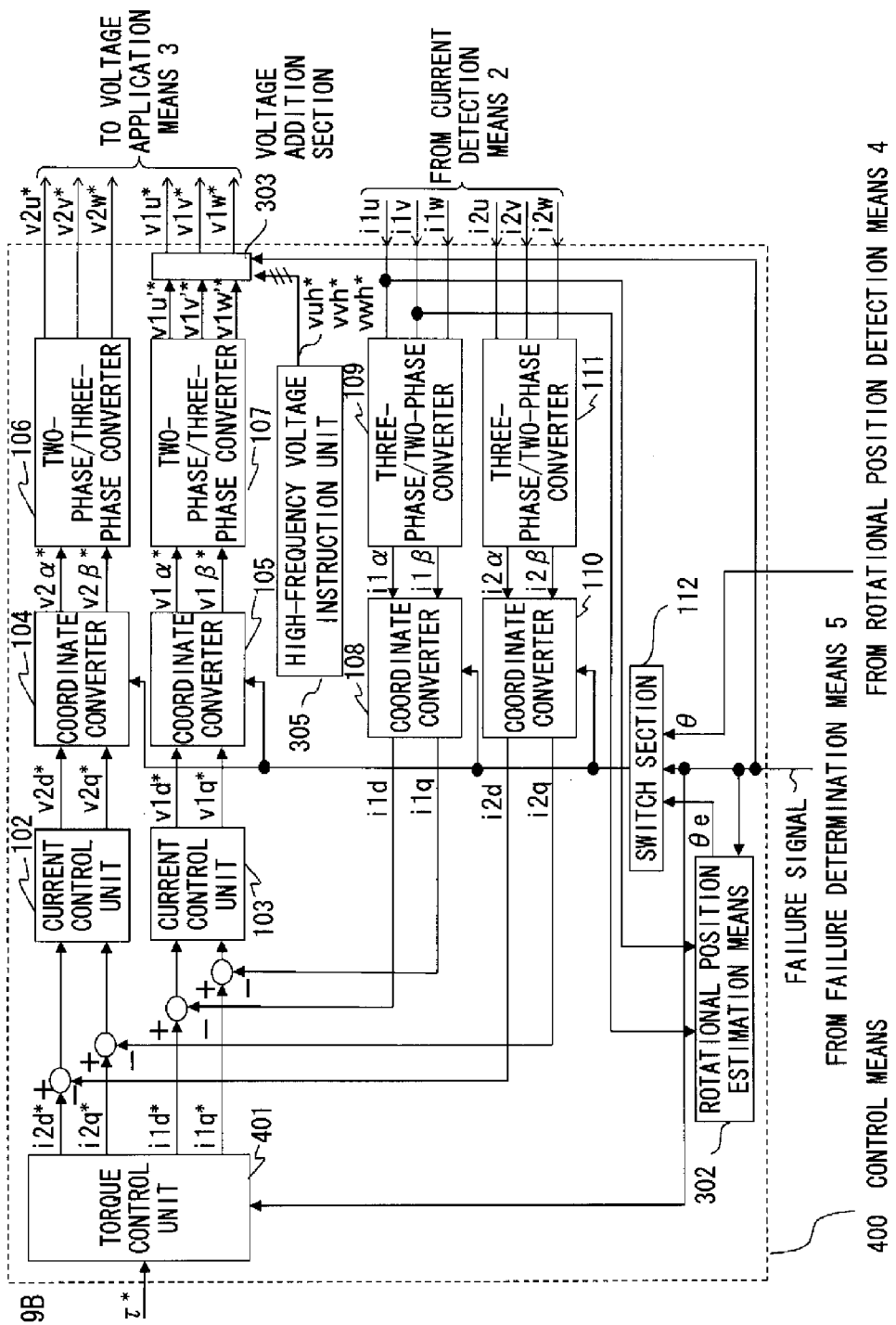

FIGS. 9A and 9B are configuration diagrams of a driving apparatus for a multiplex-winding rotary machine according to the fourth embodiment of the present invention.

In the fourth embodiment, the different part from the third embodiment (FIGS. 8A and 8B) is a torque control unit 401 of control means 400. The other configurations are basically the same as those of the third embodiment.

Similarly to the torque control unit 101 of the first embodiment, the torque control unit 401 calculates the current instruction values i1d*, i1q*, i2d*, and i2q* which differ between when a failure signal is inputted from the failure determination means 5 and when a failure signal is not inputted, with respect to the same torque instruction τ*.

That is, when a failure signal is not inputted, the torque control unit 401 sets the current instruction values as shown by the above expressions (1) and (2). FIG. 2 shows vector representation in a rotational coordinate system in this case, and i* is a value obtained by vector addition of the current instruction values i1d*, i1q*, i2d*, and i2q* for the first winding group 11 and the second winding group 12.

On the other hand, when a failure signal is inputted, the torque control unit 401 sets the current instruction values so as to satisfy the relationships shown by expressions (3) and (4), expressions (5) and (6), or expressions (7) and (8) described above. That is, one or both of the current instruction values i1d* and i1q* with respect to the first winding group 11 by which position estimation is performed are set to be small. Alternatively, similarly to the case of the torque control unit 201 of the second embodiment, when the failure determination means 5 has outputted a failure signal, the torque control unit 401 may set both the current instruction values i1d* and i1q* with respect to the first winding group 11 at zero.

Thus, in the fourth embodiment, when the failure determination means 5 has outputted a failure signal, one or both of the current instruction values i1d* and i1q* with respect to the first winding group 11 are set to be small or the current instruction values i1d* and i1q* are both set at zero. The effect obtained in this case will be described below.

If id is zero and iq is a constant value (stationary state) in the voltage/current equations (9) and (10) of the rotary machine 1 described above, the following expressions (16) and (17) are obtained, respectively.

$$Vd = -\omega \cdot Lq \cdot iq \qquad (16)$$

$$Vq = R \cdot iq + \omega \cdot \varphi \qquad (17)$$

From expressions (16) and (17), an effective value Vrms of the rotary machine voltage is represented by the following expression.

$$Vrms = \sqrt{(Vd^2 + Vq^2)} \qquad (18)$$
$$= \sqrt{\{(\omega \cdot Lq \cdot iq)^2 + (R \cdot iq + \omega \cdot \varphi)^2\}}$$

In expression (18), if the rotation rate ω is a constant value, the effective value Vrms of the rotary machine voltage monotonously increases with increase in the current iq of the rotary machine 1. Thus, with respect to the same rotation rate ω, if the current iq of the rotary machine 1 increases, the voltage of the rotary machine 1 also increases. Therefore, in order to increase current when the rotary machine 1 is driven at a constant rotation rate, the voltage instructions need to be increased. For example, in the configuration shown in FIGS. 9A and 9B, when the current instruction value i1q* is to be increased (here, i1d* is zero), the voltage instructions v1u'*, v1v'*, and v1w'* need to be increased.

On the other hand, generally, since there is an upper limit on the voltage that can be outputted by the voltage application means 3, if the voltage instruction is increased in order to increase the current of the rotary machine 1, margin for the voltage that can be outputted by the voltage application means 3 gradually decreases. Therefore, if the voltage instructions v1u'*, v1v'*, and v1w'* are increased as described above, the voltages of the high-frequency voltage instructions vuh*, vvh*, and vwh* that can be outputted by the high-frequency voltage instruction unit 305 decrease, and as a result, the estimation accuracy for the rotational position θe estimated by the rotational position estimation means 302 decreases.

Accordingly, in the fourth embodiment, the torque control unit 401 sets one or both of the current instruction values i1d* and i1q* with respect to the first winding group 11 to be small, or sets both of them at zero. Thus, as compared with the configuration of always generating the current instruction values i1d* and i1q* from the torque instruction τ* regardless of a failure signal as in the torque control unit 301 of the third embodiment, it becomes possible to increase the amplitudes of the high-frequency voltage instructions vuh*, vvh*, and vwh*. As a result, the estimation accuracy for the rotational position θe estimated by the rotational position estimation means 302 increases.

Further, in the fourth embodiment, as compared with the configuration of the third embodiment, when a failure signal is inputted to the torque control unit 401, one or both of the current instruction values i1d* and i1q* are set to be small, or the current instruction values i1d* and i1q* are both set at zero. Thus, it becomes possible to decrease the influence of the rotational position estimation error caused by mutual interference of the inductances due to magnetic saturation caused by the change of the inductance distribution by the current flowing in the rotary machine 1.

Figure 10A:
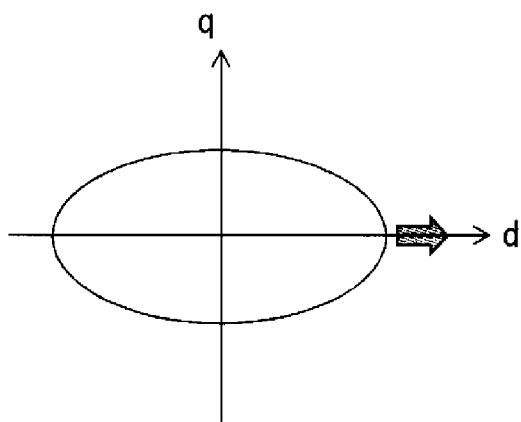
FIGS. 10A-10B are explanation diagrams showing a current vector locus of high-frequency current flowing when a high-frequency voltage instruction is applied as a voltage instruction, according to the fourth embodiment of the present invention.

The rotational position estimation error is described in detail in Japanese Laid-Open Patent Publication No. 2010-166638 (hereinafter, referred to as Patent Document 5). In the case of no load (the current instruction values satisfy i1d*=i1q*=0), a current vector locus of high-frequency current flowing when high-frequency voltage is applied by the voltage application means 3 based on the high-frequency voltage instructions vuh*, vvh*, and vwh* becomes current in a d-q coordinate system with the d-axis as the long axis and the q-axis as the short axis, as shown in FIG. 10A (here, d-axis inductance<q-axis inductance). As shown in FIG. 10A, since the phase at which the current has the maximum amplitude coincides with the d-axis, the rotational position θe can be estimated.

Figure 10B:
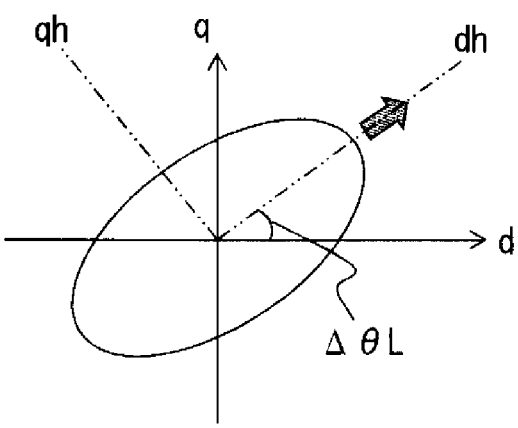

On the other hand, a current vector locus of high-frequency current in the case where the current instruction values other than zero (i1d*≠0, i1q*≠0) are given becomes an ellipse with the dh-axis as the long axis and the qh-axis as the short axis, as shown in FIG. 10B. Since the dh-axis advances from the d-axis by a phase of ΔθL, the phase ΔθL is estimation error ΔθL of the rotational position θe.

Since the estimation error ΔθL occurs due to magnetic saturation of the stator or the rotor of the rotary machine 1, the current instruction values and the estimation error ΔθL of the rotational position are substantially in a proportional relationship. The above Patent Document 5 proposes a correction method performed in accordance with the current instruction value. However, according to the fourth embodiment, one or both of the absolute values of the current instruction values i1d* and i1q* with respect to the winding group by which the position estimation is performed (here, the first winding group 11) are decreased, or both of them are set to be zero, thereby providing the effect of enabling the rotational position estimation error ΔθL to be decreased without using calculation such as correction performed in accordance with the current instruction values i1d* and i1q*, as compared with the third embodiment.

Fifth Embodiment

Figure 11A:
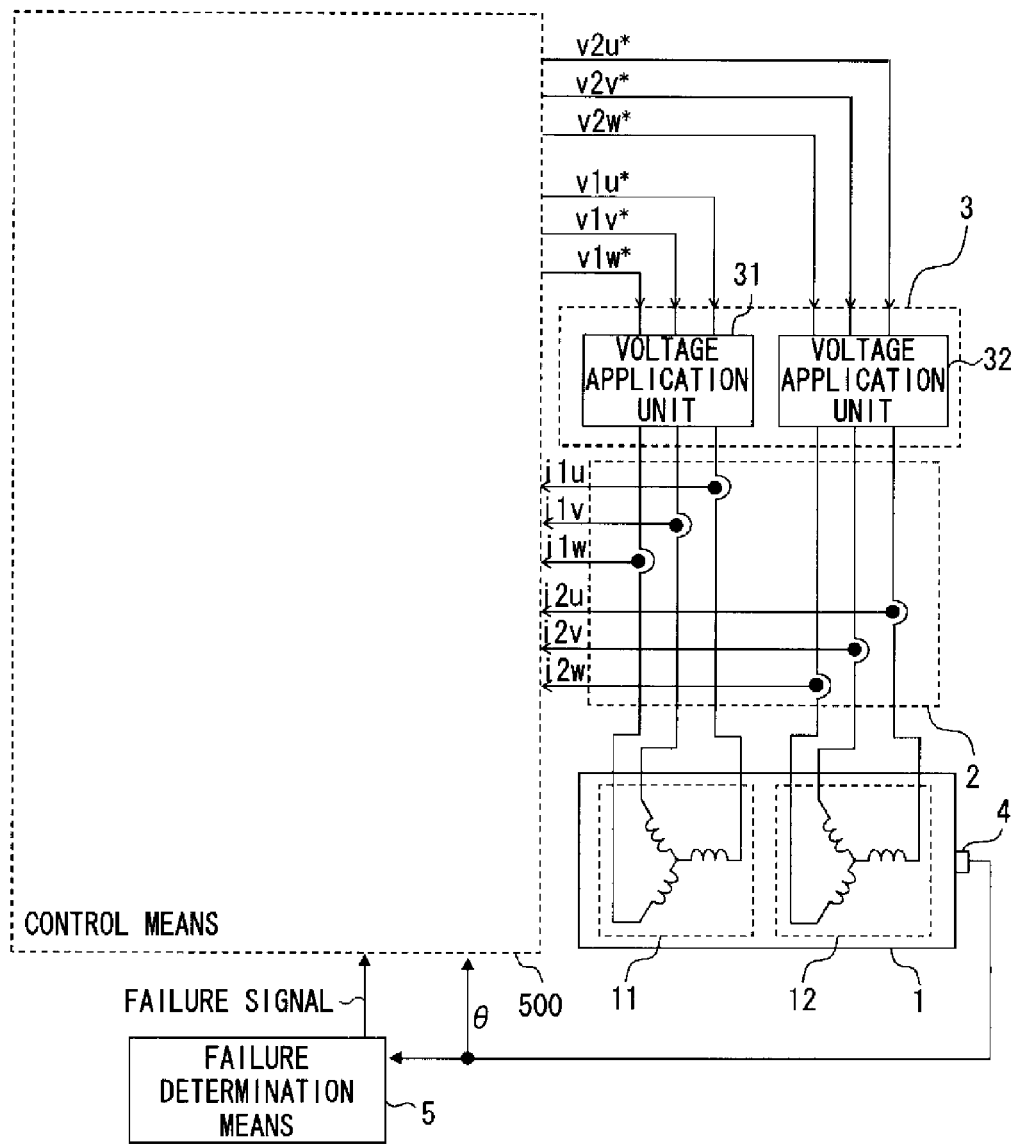
FIGS. 11A-11B are configuration diagrams of a driving apparatus for a multiplex-winding rotary machine according to the fifth embodiment of the present invention.
Figure 11B:
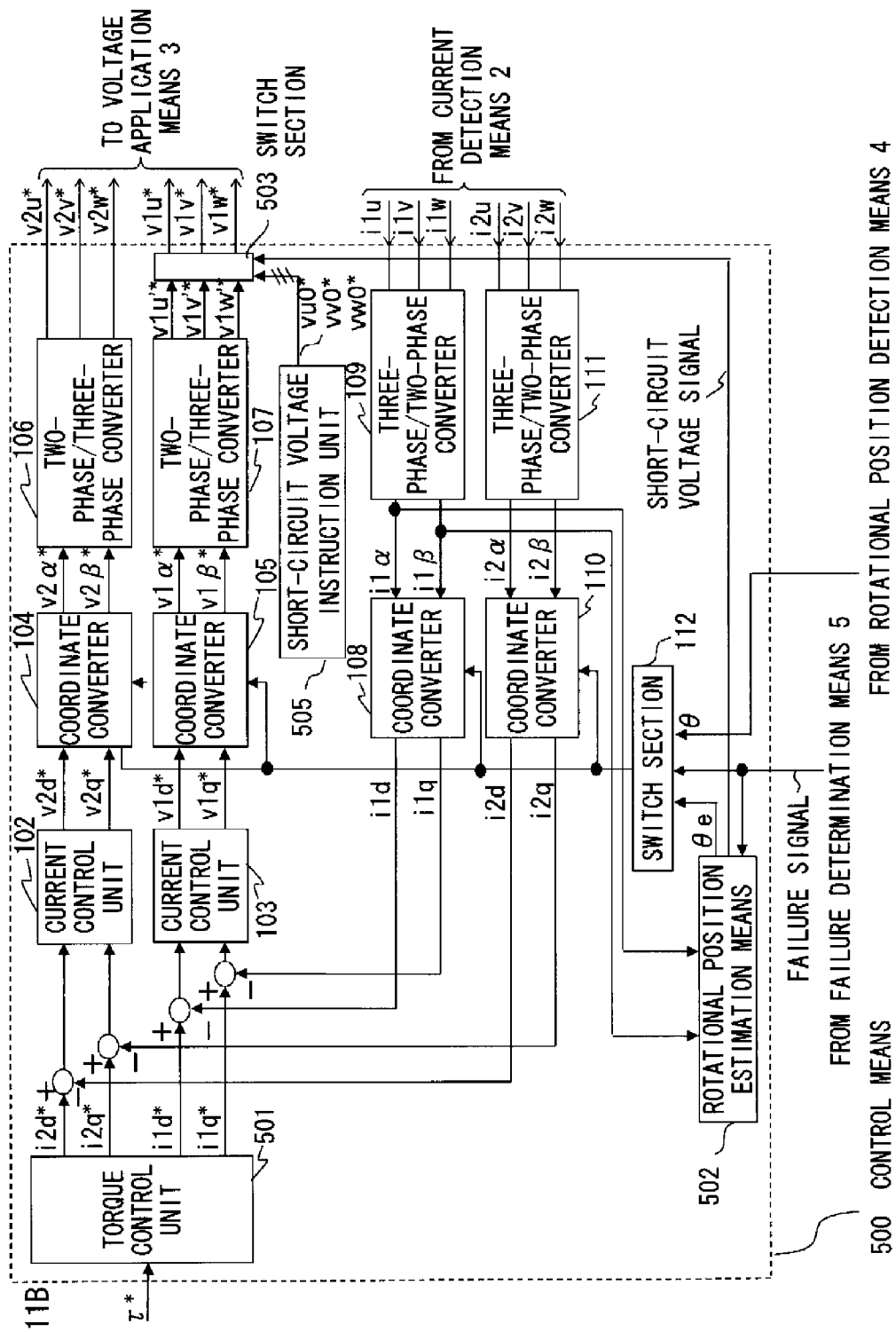

FIGS. 11A and 11B are configuration diagrams of a driving apparatus for a multiplex-winding rotary machine according to the fifth embodiment.

In the fifth embodiment, the different parts from the first embodiment (FIGS. 1A and 1B) are a torque control unit 501, rotational position estimation means 502, a short-circuit voltage instruction unit 505, and a switch section 503 of control means 500. The other configurations are basically the same as those of the first embodiment.

The feature of the fifth embodiment is that, when the failure determination means 5 has determined that the rotational position detection means 4 has failed, at least one of the winding groups of the rotary machine 1 is short-circuited for all phases, and the rotational position θe is estimated based on the current flowing in the at least one of the winding groups that is short-circuited for all phases, thereby continuing the driving. Hereinafter, the method will be described.

The torque control unit 501 generates the current instruction values i1d*, i1q*, i2d*, and i2q* in a rotational coordinate system synchronized with the rotational position θ of the rotary machine 1, in accordance with a desired driving condition of the rotary machine 1 such as rotation rate or torque, here, from the torque instruction τ*.

The rotational position estimation means 502, when a failure signal is inputted from the failure determination means 5, outputs a short-circuit voltage signal for selectively switching the output of the short-circuit voltage instruction unit 505, to the switch section 503, and estimates the rotational position θe, based on the currents i1α and i1β with respect to the first winding group 11 outputted from the three-phase/two-phase converter 109 in accordance with the output of the short-circuit voltage signal.

The short-circuit voltage instruction unit 505 generates voltage instructions vu0*, vv0*, and vw0* for all-phase short-circuit, for one voltage application unit 31. The switch section 503 is provided at the subsequent stage of the two-phase/three-phase converter 107, and outputs the voltage instructions v1u*, v1v*, and v1w* which differ between when a short-circuit voltage signal is inputted from the rotational position estimation means 502 and when a short-circuit voltage signal is not inputted.

That is, when a short-circuit voltage signal is not inputted, the switch section 503 directly outputs values v1u'*, v1v'*, and v1w'* outputted from the two-phase/three-phase converter 107, as the voltage instructions v1u*, v1v*, and v1w*.

On the other hand, when a short-circuit voltage signal is inputted, the switch section 503 outputs the voltage instructions vu0*, vv0*, and vw0* for all-phase short-circuit for the voltage application unit 31 given by the short-circuit voltage instruction unit 505, as the voltage instructions v1u*, v1v*, and v1w*.

Here, operation in the case where the voltage instructions vu0*, vv0*, and vw0* for all-phase short-circuit are given to the voltage application unit 31 will be described.

Figure 12:
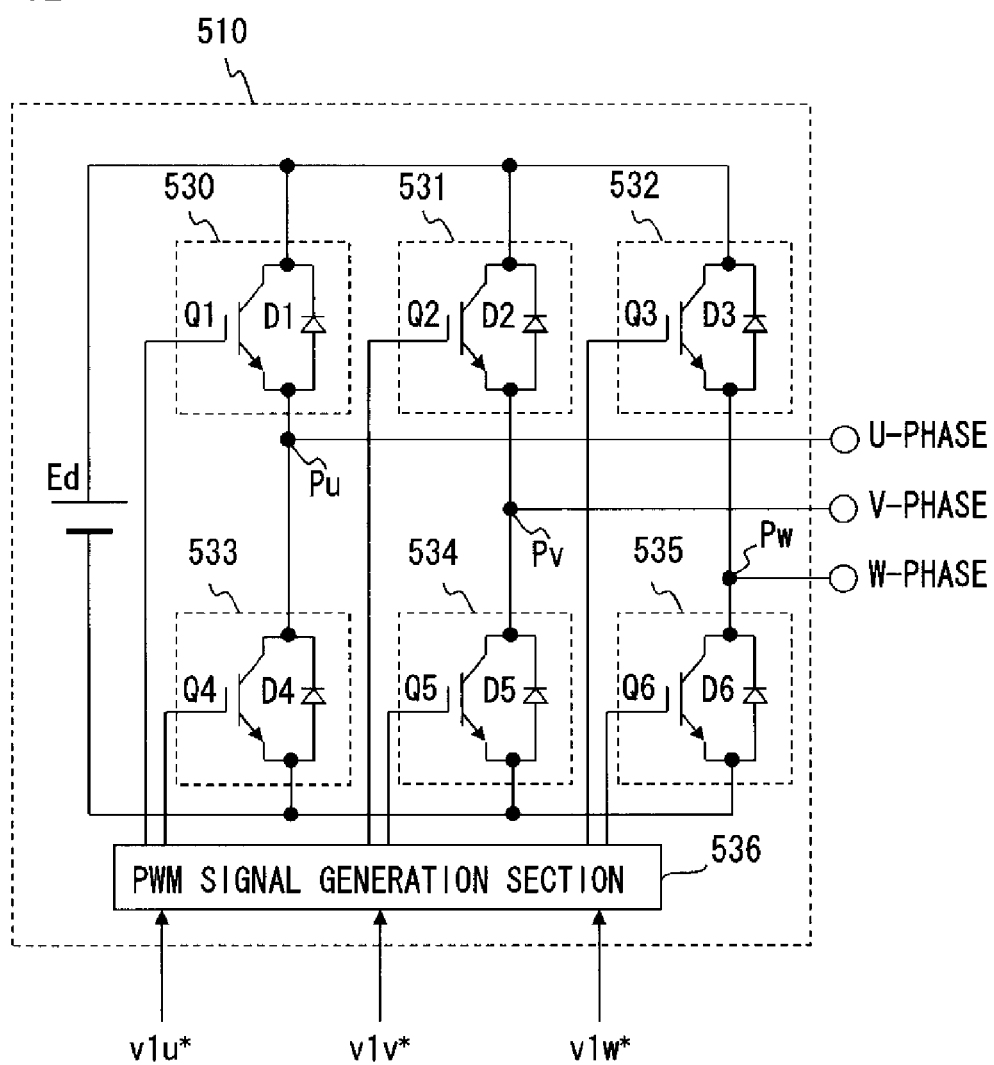
FIG. 12 is a circuit diagram showing the configuration of a voltage application unit, according to the fifth embodiment of the present invention.

Each of the voltage application units 31 and 32 is assumed to be an inverter 510 having a configuration as shown in FIG. 12. The inverter 510 has switching devices 530, 531, and 532 on an upper arm and the switching devices 533, 534, and 535 on a lower arm. The switching device 530 on the upper arm and the switching device 533 on the lower arm are connected in series, the switching device 531 on the upper arm and the switching device 534 on the lower arm are connected in series, and the switching device 532 on the upper arm and the switching device 535 on the lower arm are connected in series. Each pair of the switching devices connected in series is connected in parallel to a DC voltage source Ed, thereby forming an arm circuit for three phases of the present invention.

The switching devices 530 to 535 in this case are composed of, for example, field effect transistors (hereinafter, referred to as MOSFET) Q1 to Q6 and diodes D1 to D6, which are respectively connected in parallel. The forward directions of the diodes D1 to D6 are directed to the plus side of the DC voltage source Ed. A PWM signal generation section 536 receives the voltage instructions v1u*, v1v*, and v1w*, and outputs a PWM signal to the switching devices 530 to 535.

Here, when the voltage instructions vu0*, vv0*, and vw0* for all-phase short-circuit from the short-circuit voltage instruction unit 505 are inputted as the voltage instructions v1u*, v1v*, and v1w* to the PWM signal generation section 536, signals that turn on all the switching devices 530 to 532 on the upper arm of the inverter, or signals that turn on all the switching devices 533 to 535 on the lower arm of the inverter, are outputted, thereby realizing short-circuited state for all phases.

Figure 13:
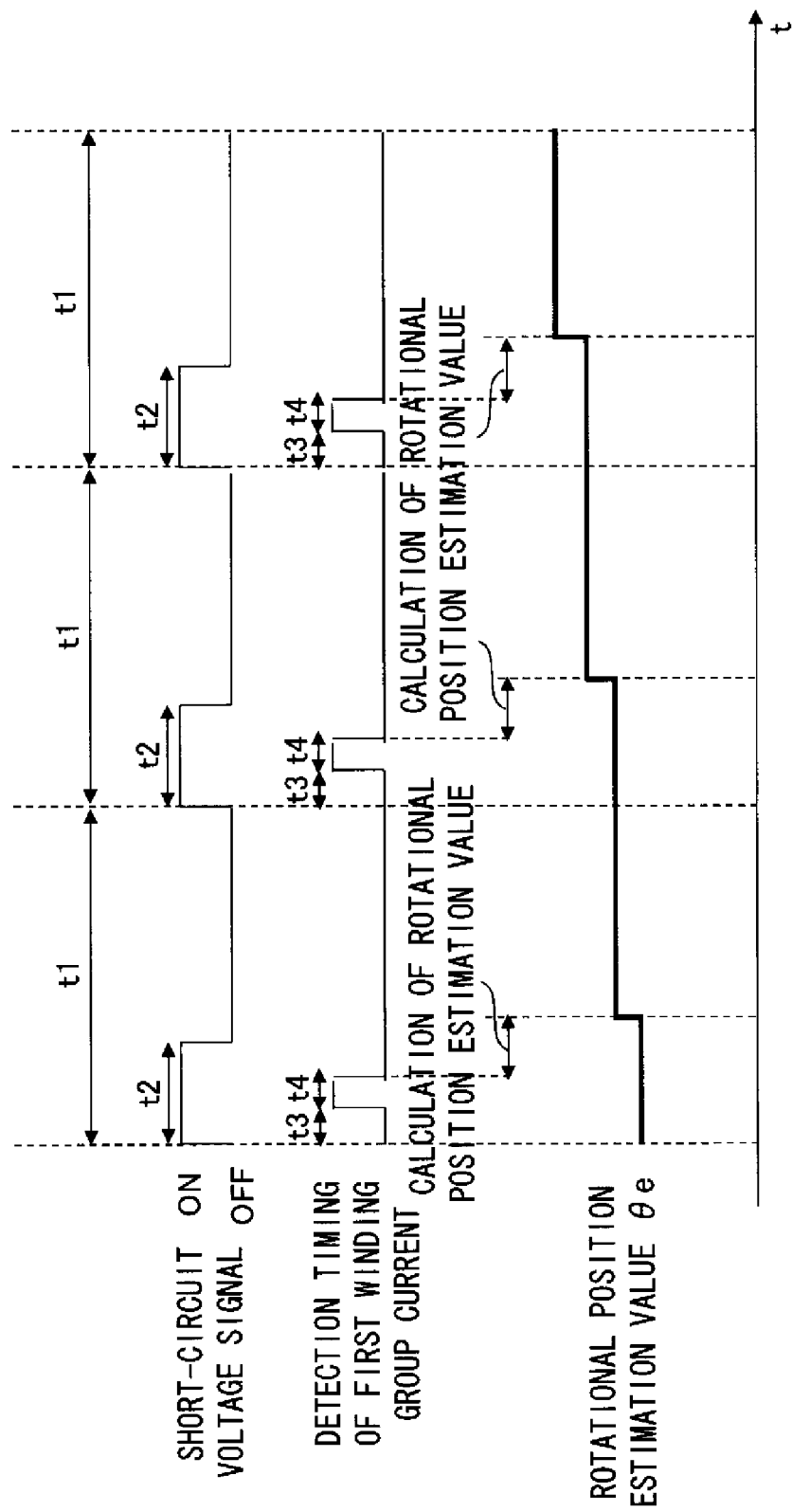
FIG. 13 is a timing chart showing an example of processing operation to estimate the rotational position, according to the fifth embodiment of the present invention.

When a failure signal is inputted from the failure determination means 5, the rotational position estimation means 502 outputs a short-circuit voltage signal to the switch section 503, whereby the voltage application unit 31 is short-circuited for all phases as described above. At this time, the rotational position estimation means 502 estimates the rotational position θe, based on the currents i1α and i1β in a two-axis coordinate system at rest obtained as the output of the three-phase/two-phase converter 109 with respect to the first winding group 11. The estimation procedure of the rotational position θe in this case will be described with reference to a timing chart shown in FIG. 13.

When a failure signal is inputted to the rotational position estimation means 502, the rotational position estimation means 502 outputs a short-circuit voltage signal for a certain period t2 in a certain cycle of t1, whereby the first winding group 11 corresponding to the voltage application unit 31 is short-circuited for all phases during each certain period t2. After a certain period t3 from the output timing of the short-circuit voltage signal, the rotational position estimation means 502 takes the currents i1α and i1β with respect to the first winding group 11 obtained by the three-phase/two-phase converter 109. It is noted that in FIG. 13, a period t4 is a time taken from start of detection of the currents i1α and i1β with respect to the first winding group 11 until the detected currents are inputted to the rotational position estimation means 502. After the period t4 has elapsed, the rotational position estimation means 502 calculates an estimated value of the rotational position θe, based on the inputted currents i1α and i1β with respect to the first winding group 11.

Next, the principle of estimation calculation of the rotational position θe by the rotational position estimation means 502 will be described.

By deforming the voltage/current equations of the rotary machine 1 represented by the above expressions (9) and (10), equations of state with respect to current are obtained as shown in the following expressions (19) and (20).

$$pid = -R/Ld \cdot id + \omega \cdot Lq/Ld \cdot iq + vd/Ld \quad (19)$$

$$piq = -\omega \cdot Ld/Lq \cdot id - R/Lq \cdot iq + (vq - \omega \cdot \phi f)/Ld \quad (20)$$

By solving expressions (19) and (20), the following expressions (21) and (22) are obtained.

$$id = \phi f/Ld \cdot (\cos \omega t - 1) \quad (21)$$

$$iq = -\phi f/Lq \cdot \sin \omega t \quad (22)$$

Here, ω is a constant value, R is zero, and the initial values of vd, vq, id, and iq are all zero.

In expressions (21) and (22), if the rotation rate ω of the rotary machine 1 is obtained, id and iq in the case where the three-phase windings are short-circuited can be calculated.

Then, if id and iq are obtained from expressions (21) and (22), the magnetic pole position θe of the rotor can be obtained from the following expression (24) by using a phase angle θc of a current vector represented by the following expression (23).

$$\theta c = \tan^{-1}(i\beta/i\alpha) \quad (23)$$

$$\theta e = \theta c - \tan^{-1}(iq/id) \quad (24)$$

In order to obtain the magnetic pole position θe from expression (24), the rotation rate ω of the rotary machine 1 needs to be obtained as described above. An absolute value Is of the short-circuit current flowing in the first winding group 11 of the rotary machine 1 when the winding group 11 is short-circuited for all phases is represented by the following expression (25) by using expressions (21) and (22).

$$Is = \sqrt{(id^2 + iq^2)} \quad (25)$$
$$= \sqrt{[\{\varphi f/Ld \cdot (\cos \omega t - 1)\}^2 + \{(\varphi f/Lq \cdot (\sin \omega t)\}^2]}$$

On the other hand, the relationship between the short-circuit current Is, and the currents i1α and i1β with respect to the first winding group 11 obtained by the three-phase/two-phase converter 109 based on the detection output from the current detection means 2, is represented by the following expression (26).

$$Is = \sqrt{(i1\alpha^2 + i1\beta^2)} \quad (26)$$

Therefore, the rotation rate ω is calculated, by using expression (25), from the value of the short-circuit current Is obtained by expression (26), and id and iq are obtained by expressions (21) and (22), whereby the magnetic pole position θe can be obtained by expression (24).

In addition, the rotation rate ω may be calculated from a temporal differential of θe calculated every certain time t1, as shown by the following expression (27).

$$\omega(n+1) = \{\theta e(n+1) - \theta e(n)\}/t1 \quad (27)$$

Here, θe(n+1) and θe(n) are rotational position estimation values calculated when a short-circuit voltage signal is outputted for the (n+1)-th and n-th times (n: natural number), respectively, and ω(n+1) is a rotation rate calculated when the voltage instructions vu0*, vv0*, and vw0* for all-phase short-circuit are outputted for the (n+1)-th time.

In the fifth embodiment, of the first winding group 11 and the second winding group 12, the first winding group 11 is short-circuited for all phases as an example. However, the present invention is not limited thereto. If at least one winding group to be short-circuited for all phases and at least one winding group not to be short-circuited for all phases are provided, even at the moment when the winding group to be short-circuited for all phases is in all-phase short-circuited state, the rotary machine 1 can be driven while continuously outputting torque, by outputting torque using the winding group not to be short-circuited for all phases.

As described above, according to the fifth embodiment, at least one winding group is short-circuited for all phases, and the rotational position estimation means 502 estimates the rotational position θe, based on current flowing when the winding group is short-circuited for all phases. Therefore, the rotational position θe can be estimated even in idling state of the rotary machine 1 when the voltage application means 3 stops its operation. Therefore, it becomes possible to smoothly continue the driving while estimating the rotational position θe, even when the voltage application means 3 is restarted from the idling state to drive the rotary machine 1.

Sixth Embodiment

Figure 14A:
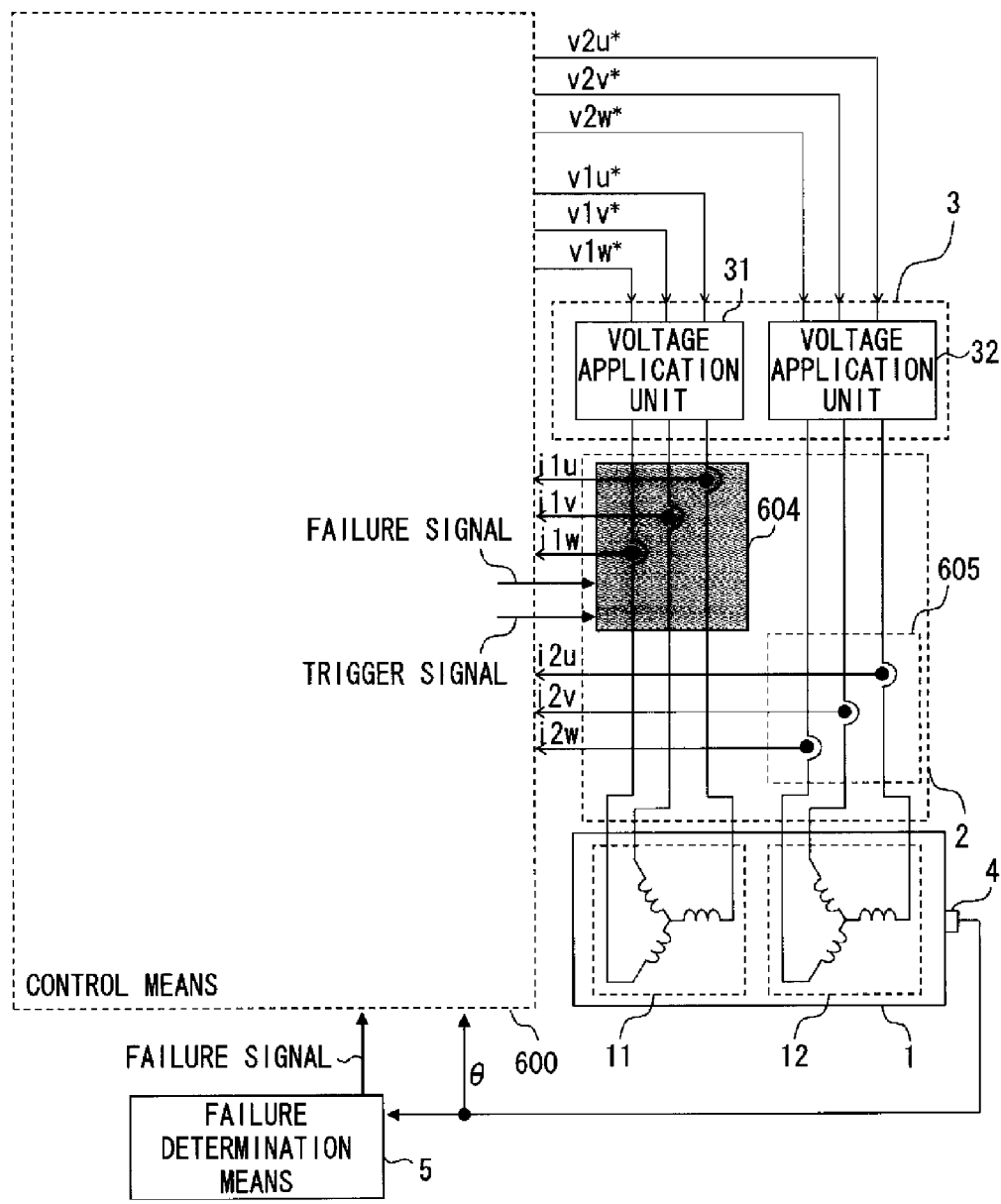
FIGS. 14A-14B are configuration diagrams of a driving apparatus for a multiplex-winding rotary machine according to the sixth embodiment of the present invention.
Figure 14B:
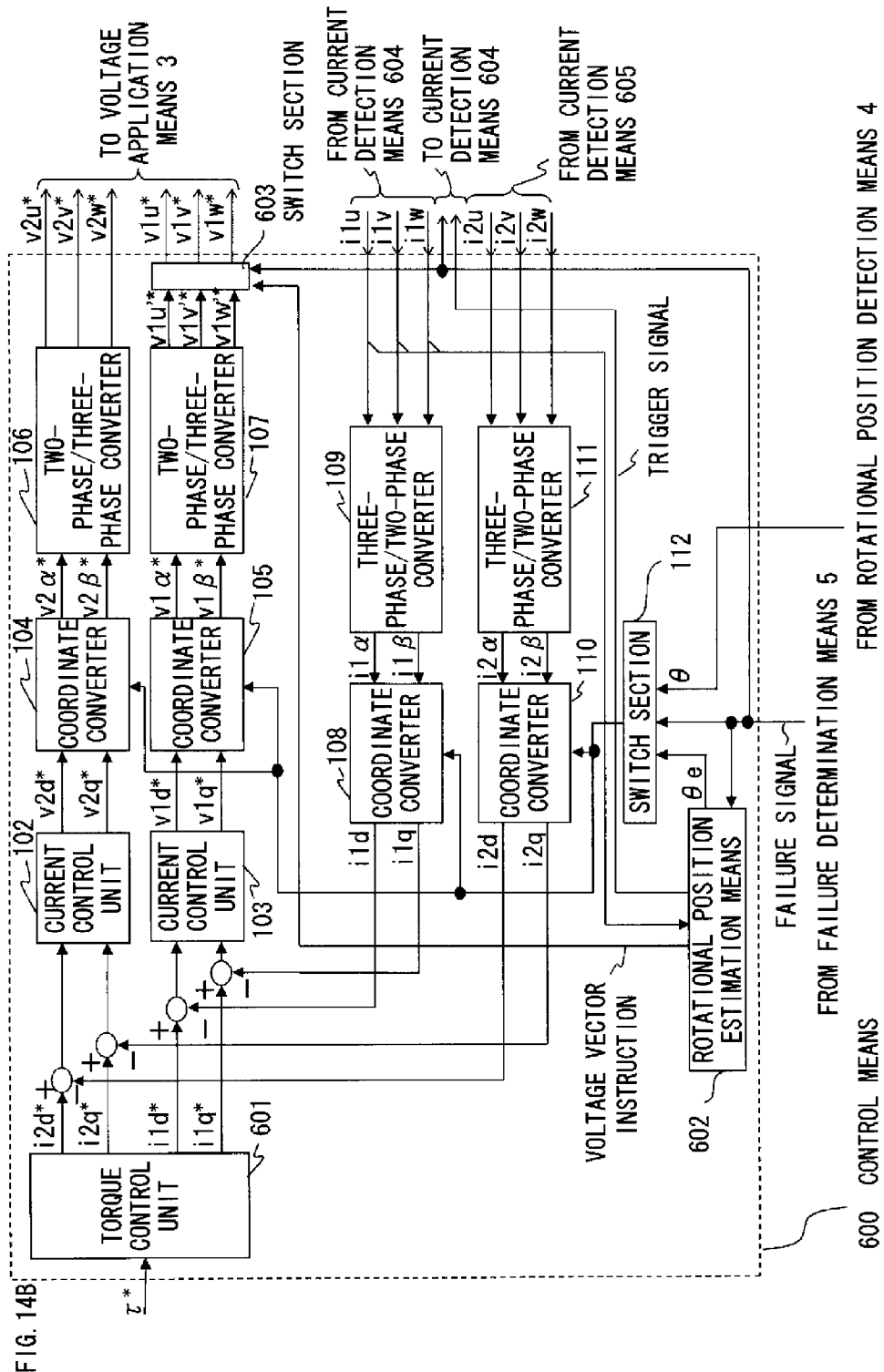

FIGS. 14A and 14B are configuration diagrams of a driving apparatus for a multiplex-winding rotary machine according to the sixth embodiment of the present invention.

In the sixth embodiment, the different parts from the first embodiment (FIGS. 1A and 1B) are a torque control unit 601, rotational position estimation means 602, and a switch section 603 of control means 600, and current detection sections 604 and 605 of the current detection means 2. The other configurations are basically the same as those of the first embodiment.

The torque control unit 601 generates the current instruction values i1d*, i1q*, i2d*, and i2q* in a rotational coordinate system synchronized with the rotational position of the rotary machine 1, in accordance with a desired driving condition of the rotary machine 1 such as rotation rate or torque, here, from the torque instruction τ*.

The switch section 603 is provided at the subsequent stage of the two-phase/three-phase converter 107, and outputs the voltage instructions v1u*, v1v*, and v1w* which differ between when a failure signal is inputted from the failure determination means 5 and when a failure signal is not inputted.

That is, when a failure signal is not inputted, the voltage addition section 603 directly outputs values v1u'*, v1v'*, and v1w'* outputted from the two-phase/three-phase converter 107, as the voltage instructions v1u*, v1v*, and v1w*.

On the other hand, when a failure signal is inputted, the voltage addition section 603 outputs later-described voltage vector instructions outputted from the rotational position estimation means 602, as the voltage instructions v1u*, v1v*, and v1w*. The voltage vector instructions will be described later.

The rotational position estimation means 602, when a failure signal is inputted from the failure determination means 5, outputs voltage vector instructions to the switch section 603, and outputs a trigger signal for sampling the currents i1u, i1v, and i1w for the respective phases of the first winding group 11, to the current detection section 604 provided for the voltage application unit 31. Then, based on the currents i1u, i1v, and i1w for the respective phases obtained by the current detection section 604 in accordance with the output of the trigger signal, the rotational position estimation means 602 performs calculation processing described later, to estimate the rotational position θe, and outputs the rotational position θe to each of the coordinate converters 104, 105, 108, and 110.

Here, of the two current detection sections 604 and 605 of the current detection means 2, the current detection section 604 provided for one voltage application unit 31 performs different operation between when a failure signal is inputted from the failure determination means 5 and when a failure signal is not inputted.

That is, when a failure signal is not inputted, the current detection section 604 detects the currents for the respective phases of the first winding group 11 at regular time intervals, and directly outputs the detected currents i1u, i1v, and i1w for the respective phases to the three-phase/two-phase converter 109.

On the other hand, when a failure signal is Inputted, the current detection section 604 detects the currents i1u, i1v, and i1w for the respective phases of the first winding group 11 at a rising timing of the trigger signal given from the rotational position estimation means 602. Then, the current detection section 604 outputs these currents i1u, i1v, and i1w to the rotational position estimation means 602. It is noted that the other current detection section 605 detects the currents i2u, i2v, and i2w for the respective phases of the second winding group 12 at regular time intervals, and outputs the detected currents i2u, i2v, and i2w for the respective phases to the three-phase/two-phase converter 111.

Here, the case where the inverter 510 having the configuration described in the fifth embodiment (see FIG. 12) is used as the voltage application unit 31 will be described. When the voltage instructions v1u*, v1v*, and v1w* are inputted to the inverter 510, the PWM signal generation section 536 generates gate signals to be applied to the gates of the MOSFETs Q1 to Q6, based on the voltage instructions v1u*, v1v*, and v1w*, and the MOSFETs Q1 to Q6 are turned on or off by the gate signals.

By the gate signals given to the MOSFETs Q1 to Q6 in this case, the following nine switching modes "0" to "8" occur. The switching modes "0" to "8" are defined as follows in accordance with combinations of the MOSFETs Q1 to Q6.

| Switching Mode | MOSFET to be turned ON | Corresponding Voltage Vector |
|---|---|---|
| "0" | No MOSFET | — |
| "1" | Q1, Q5, Q6 | V1 |
| "2" | Q1, Q2, Q6 | V2 |
| "3" | Q4, Q2, Q6 | V3 |
| "4" | Q4, Q2, Q3 | V4 |
| "5" | Q4, Q5, Q3 | V5 |
| "6" | Q1, Q5, Q3 | V6 |
| "7" | Q1, Q2, Q3 | V0 |
| "8" | Q4, Q5, Q6 | V0 |

Figure 15:
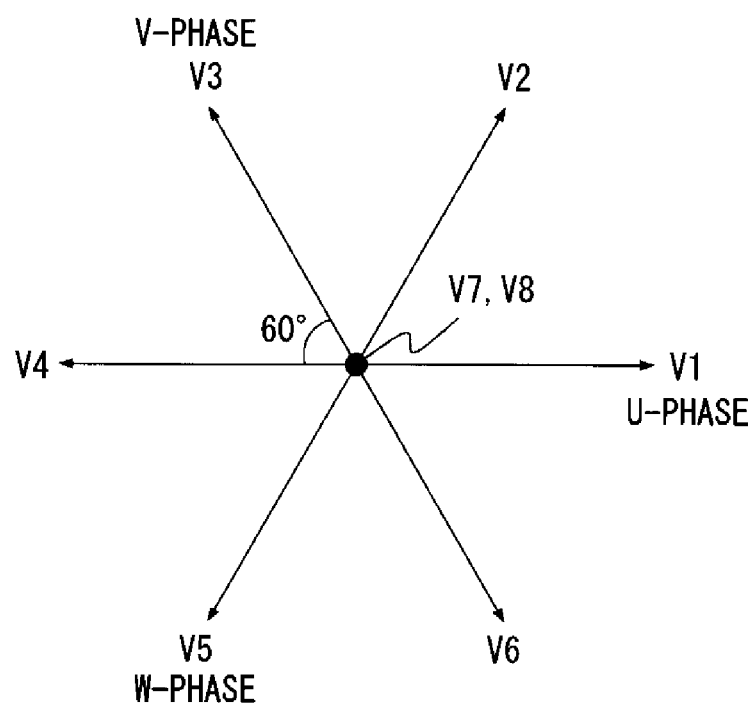
FIG. 15 is an explanation diagram showing the relationship between voltage vectors and their phases, according to the sixth embodiment of the present invention.

Here, voltage states occurring in the first winding group 11 in accordance with the states of the switching modes "1" to "8" caused by the voltage instructions v1u*, v1v*, and v1w* given to the voltage application unit 31 are respectively defined as voltage vectors. The voltage vectors include states of V0 and V1 to V6. The six voltage vectors V1 to V6 respectively corresponding to the switching modes "1" to "6" each have a phase difference of 60 degrees from the adjacent one and have the same magnitude, as shown in FIG. 15. In addition, the magnitude of the voltage vector V0 corresponding to the switching modes "7" and "8" is zero. Here, the voltage instructions v1u*, v1v*, and v1w* for causing the switching modes "1" to "6" and "7" (or "8") corresponding to the voltage vectors V1 to V6 and V0 are referred to as voltage vector instructions.

Here, as an example, the magnitude of the voltage vector V1 corresponding to the switching mode "1" will be specifically calculated. In the switching mode "1" corresponding to the voltage vector V1, the MOSFETs Q1, Q5, and Q6 are turned on and the MOSFETs Q4, Q2, and Q3 are turned off. Therefore, line voltage Vuv between the U-phase and the V-phase, line voltage Vvw between the V-phase and the W-phase, and line voltage Vwu between the W-phase and the U-phase are represented by the following expressions (28) to (30).

$$Vuv = Vu - Vv = Ed \quad (28)$$

$$Vvw = Vv - Vw = 0 \quad (29)$$

$$Vwu = Vw - Vu = -Ed \quad (30)$$

Here, "Vu" is the potential of the U-phase (the potential of a midpoint Pu), "Vv" is the potential of the V-phase (the potential of a midpoint Pv), and "Vw" is the potential of the W-phase (the potential of a midpoint Pw).

Further, by calculating the potentials Vu to Vw from expressions (28) to (30), the potentials Vu to Vw are represented by the following expressions (31) to (33).

$$Vu = (2/3)Ed \quad (31)$$

$$Vv = -(1/3)Ed \quad (32)$$

$$Vw = -(1/3)Ed \quad (33)$$

Therefore, the direction of the voltage vector V1 is the direction of the U-phase as shown in FIG. 15. In addition, the magnitude |V1| of the voltage vector V1 is represented by the following expression (34).

$$|V1| = (2/3)Ed - (1/3)Ed \cdot \cos(120 \text{ degrees}) - (1/3)Ed \cdot \cos(240 \text{ degrees}) = Ed \quad (34)$$

It is noted that the directions and the magnitudes of the other voltage vectors V2 to V6 can be obtained through the same calculation as in the voltage vector V1. As shown in FIG. 15, the directions of the voltage vectors V2 to V6 are progressively separated by a phase difference of 60 degrees from the U-phase, and their magnitudes are Ed. In addition, the magnitude of the voltage vector V0 is zero.

As described above, when a failure signal is inputted, the switch section 603 selects and outputs the voltage vector instructions outputted from the rotational position estimation means 602. As a result, in the voltage application unit 31, the switching modes "1" to "6" and "7" (or "8") sequentially occur in a time-division manner, and along with the occurrence, in the first winding group 11 of the rotary machine 1, the voltage vectors V1 to V6 and V0 respectively corresponding to the switching modes "1" to "6" and "7" (or "8") sequentially occur. Meanwhile, the current detection section 604 detects the currents i1u, i1v, and i1w flowing in the respective phases, at the rising timing of the trigger signal from the rotational position estimation means 602.

Figure 16:
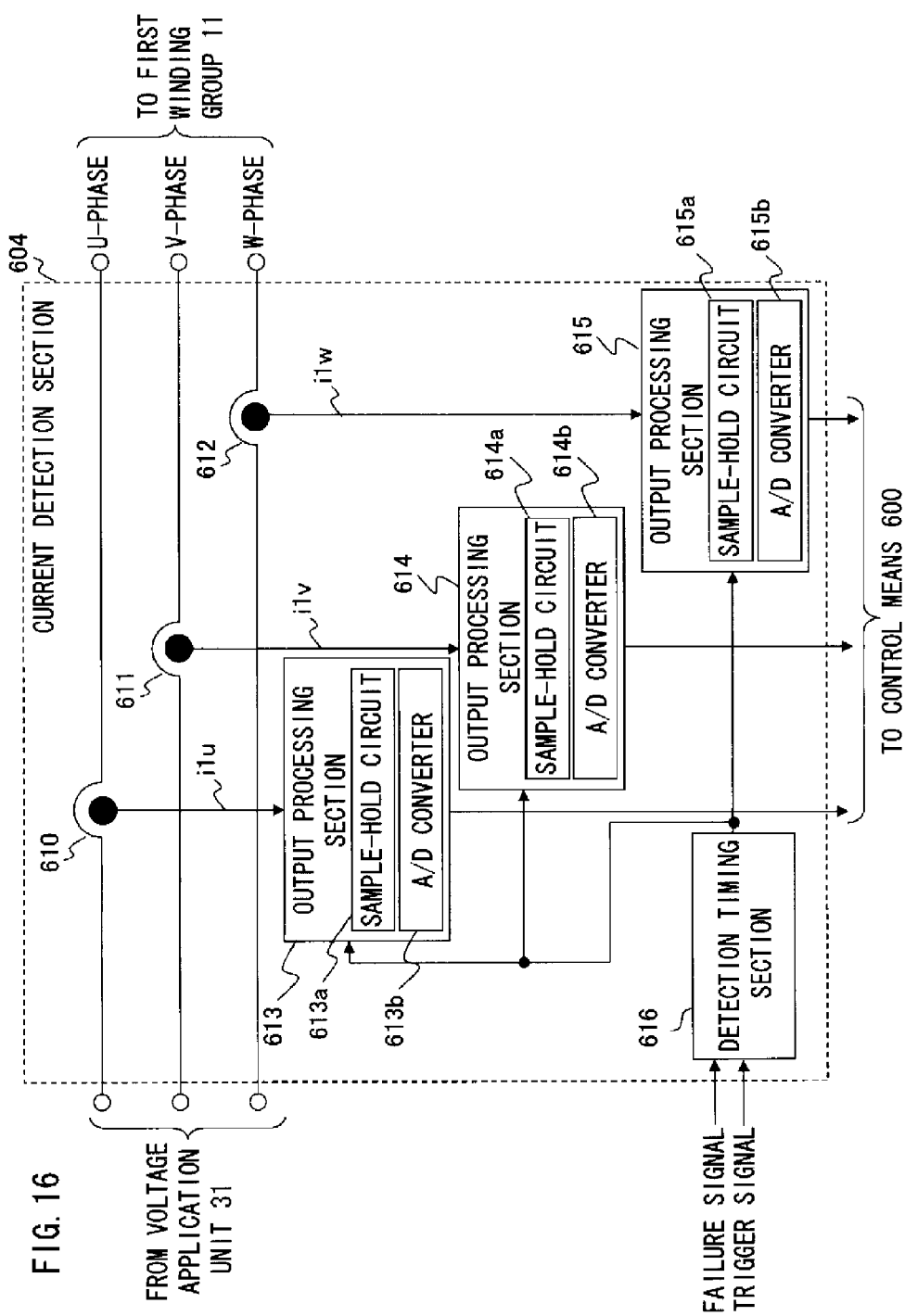
FIG. 16 is a block diagram showing the configuration of a current detection section according to the sixth embodiment of the present invention.

FIG. 16 is a block diagram showing the detailed configuration of the current detection section 604.

In FIG. 16, current detectors 610 to 612 detect the currents flowing in the U-phase, the V-phase, and the W-phase, respectively, and output the detected currents to output processing sections 613, 614, and 615, respectively. The output processing sections 613, 614, and 615 have sample-hold circuits 613a, 614a, and 615a, and A/D converters 613b, 614b, and 615b, respectively.

A detection timing section 616, when a failure signal is inputted from the failure determination means 5, outputs a trigger signal outputted from the rotational position estimation means 602 in accordance with the input, to the sample-hold circuits 613a, 614a, and 615a. On the other hand, when a failure signal is not inputted from the failure determination means 5, the detection timing section 616 by itself generates a trigger signal at regular time intervals to output the trigger signal to the sample-hold circuits 613a, 614a, and 615a.

The sample-hold circuits 613a, 614a, and 615a samples and holds current values detected by the current detectors 610 to 612, at a rising timing of the trigger signal Tr inputted from the detection timing section 616. Then, the A/D converters 613b, 614b, and 615b respectively convert the analog signals held by the sample-hold circuits 613a, 614a, and 615a, to digital signals, and respectively output the digital signals of the current i1u for U-phase, the current i1v for V-phase, and the current i1w for W-phase, to the control means 600.

Figure 17:
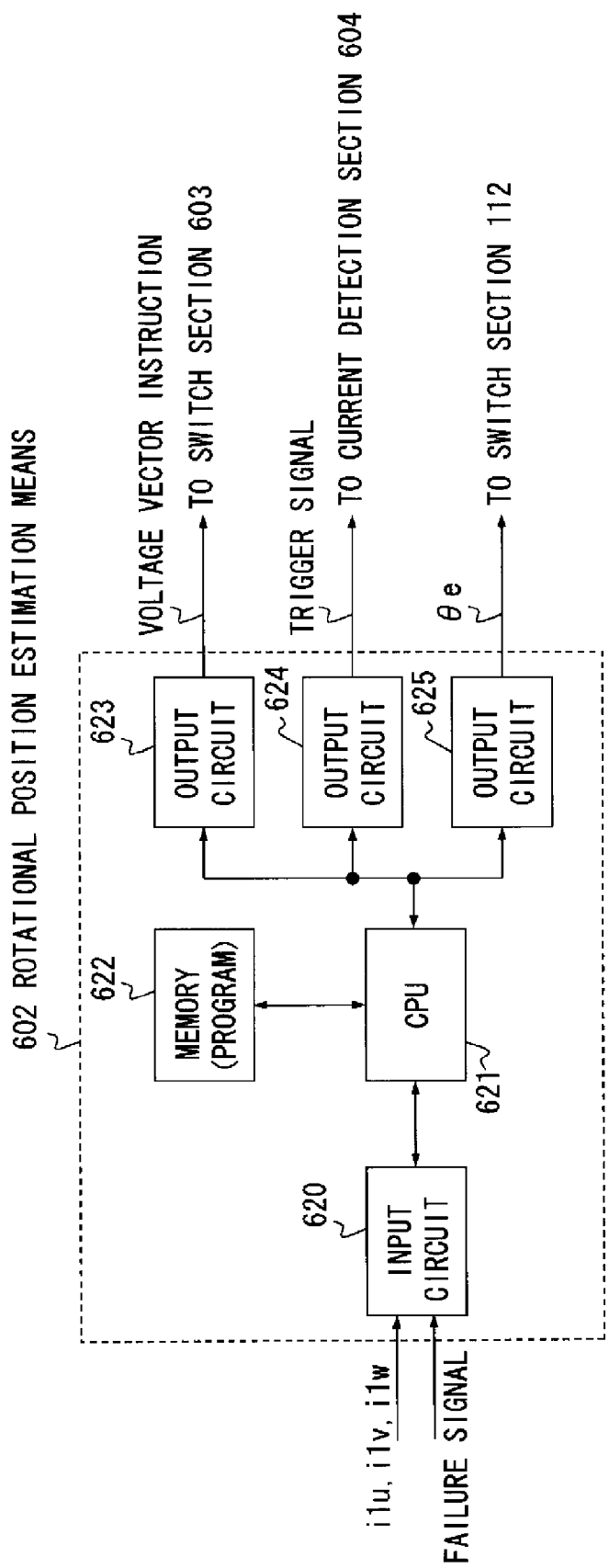
FIG. 17 is a block diagram showing the configuration of rotational position estimation means according to the sixth embodiment of the present invention.

FIG. 17 is a block diagram showing the detailed configuration of the rotational position estimation means 602.

In FIG. 17, when a failure signal is inputted from the failure determination means 5, a CPU 621 outputs voltage vector instructions to the switch section 603 via an output circuit 623, based on a predetermined program held in a memory 622, and outputs a trigger signal to the current detection section 604 via an output circuit 624. Further, when the currents i1u, i1v, and i1w detected by the current detection section 604 in accordance with the trigger signal are inputted to an input circuit 620, the CPU 621 performs calculation processing described later, based on the currents i1u, i1v, and i1w, to estimate the rotational position θe, and outputs the rotational position to the switch section 112 via an output circuit 625.

Figure 18:
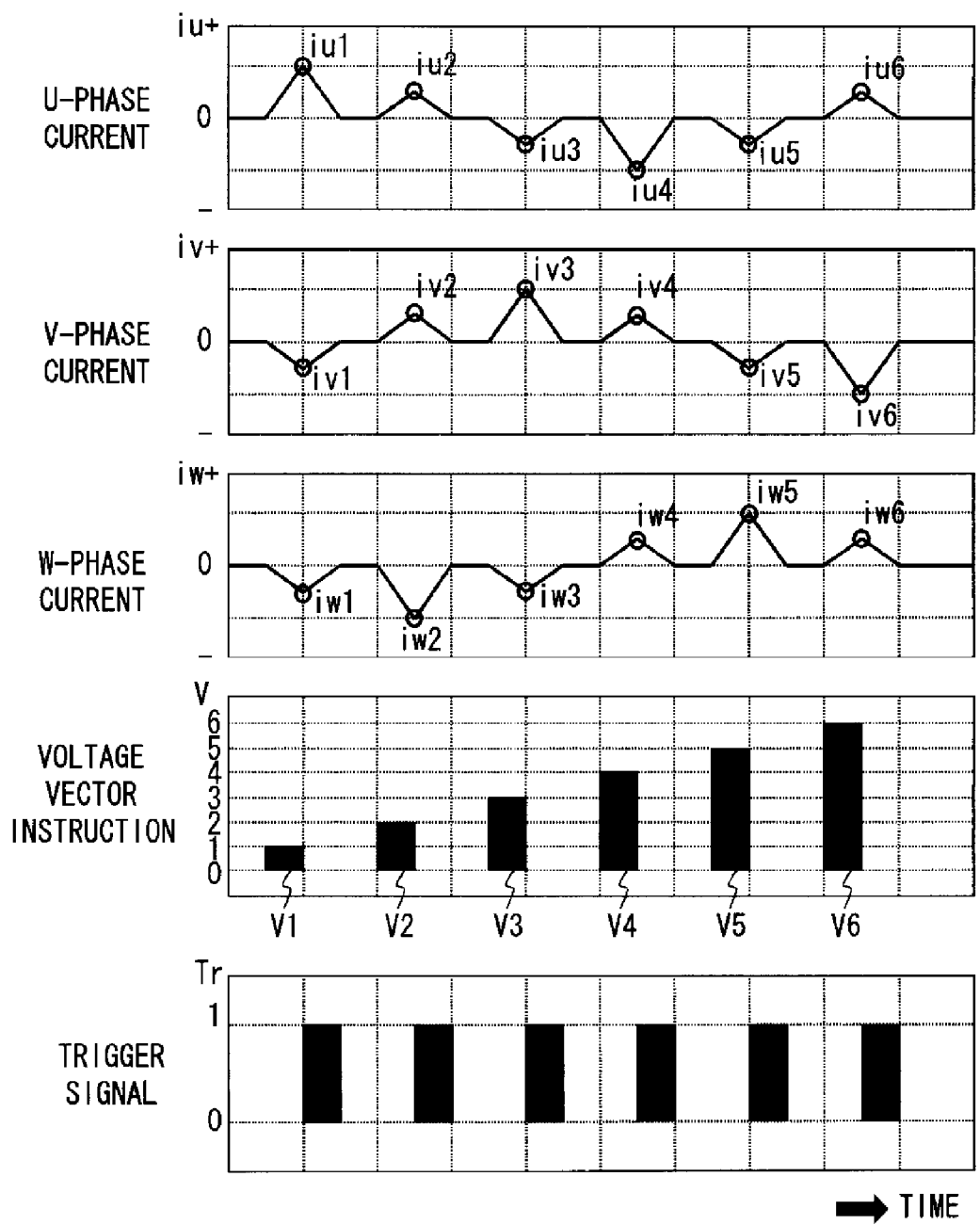
FIG. 18 is a timing chart showing the relationship among a voltage vector instruction, a trigger signal, and each phase current detected by the current detection section, according to the sixth embodiment of the present invention.

FIG. 18 is a timing chart showing the relationship among the voltage vector instructions given from the rotational position estimation means 602 to the switch section 603, a trigger signal, and the currents i1u, i1v, and i1w detected by the current detection section 604.

In FIG. 18, when a failure signal is inputted from the failure determination means 5, the rotational position estimation means 602 sequentially outputs voltage vector instructions in a time-division manner to the voltage application unit 31 via the switch section 603 such that the voltage vectors corresponding to the above-described switching modes "1" to "6" and "7" (or "8") occur in the first winding group 11 in order of V0→V1→V0→V2→V0→V3→V0→V4→V0→V5→V0→V6→V0.

Here, the application period of each of the voltage vectors V1 to V6 is set to be sufficient for magnetically saturating the coil of the rotary machine 1, so that the coil of the first winding group 11 is magnetically saturated by application of each of the voltage vectors V1 to V6. It is noted that in order to ensure dead time, the voltage vector V0 is provided between each pair of adjacent ones of the voltage vectors V1 to V6.

In addition, the control means 600 outputs a trigger signal to the current detection section 604 just after application of each of the voltage vectors V1 to V6 is finished. At the rising timing of each trigger signal, the current detection section 604 detects the currents i1u (i1u1 to i1u6), i1v (i1v1 to i1v6), and i1w (i1w1 to i1w6) for the respective phases, and outputs the detected currents to the rotational position estimation means 602.

Here, current Δiu which is the amplitude sum of the current i1u detected when the voltage vector V1 having a phase equal to the U-phase occurs, and the current i1u detected when the voltage vector V4 having a phase different from that of the voltage vector V1 by 180 degrees (see FIG. 15) occurs, is defined by the following expression (35). In this case, since the voltage vectors V1 to V6 occur in order of V1→V2→V3→V4→V5→V6, current iu detected when the voltage vector V1 occurs is current iu1, and current iu detected when the voltage vector V4 occurs is current iu4. Therefore, the current Δi1u is represented as follows.

$$\Delta i1u = i1u1 + i1u4 \quad (35)$$

Similarly, current Δi1y which is the amplitude sum of the current i1v detected when the voltage vector V3 having a phase equal to the V-phase occurs, and the current i1v detected when the voltage vector V6 having a phase different from that of the voltage vector V3 by 180 degrees occurs, is defined by the following expression (36). In addition, current Δiw which is the amplitude sum of the current i1w detected when the voltage vector V5 having a phase equal to the W-phase occurs, and the current i1w detected when the voltage vector V2 having a phase different from that of the voltage vector V5 by 180 degrees occurs, is defined by the following expression (37). In this case, in view of the above occurrence order of the voltage vectors V1 to V6, expressions (36) and (37) are represented as follows.

$$\Delta i1y = i1v3 + i1v6 \quad (36)$$

$$\Delta i1w = i1w5 + i1w2 \quad (37)$$

Figure 19:
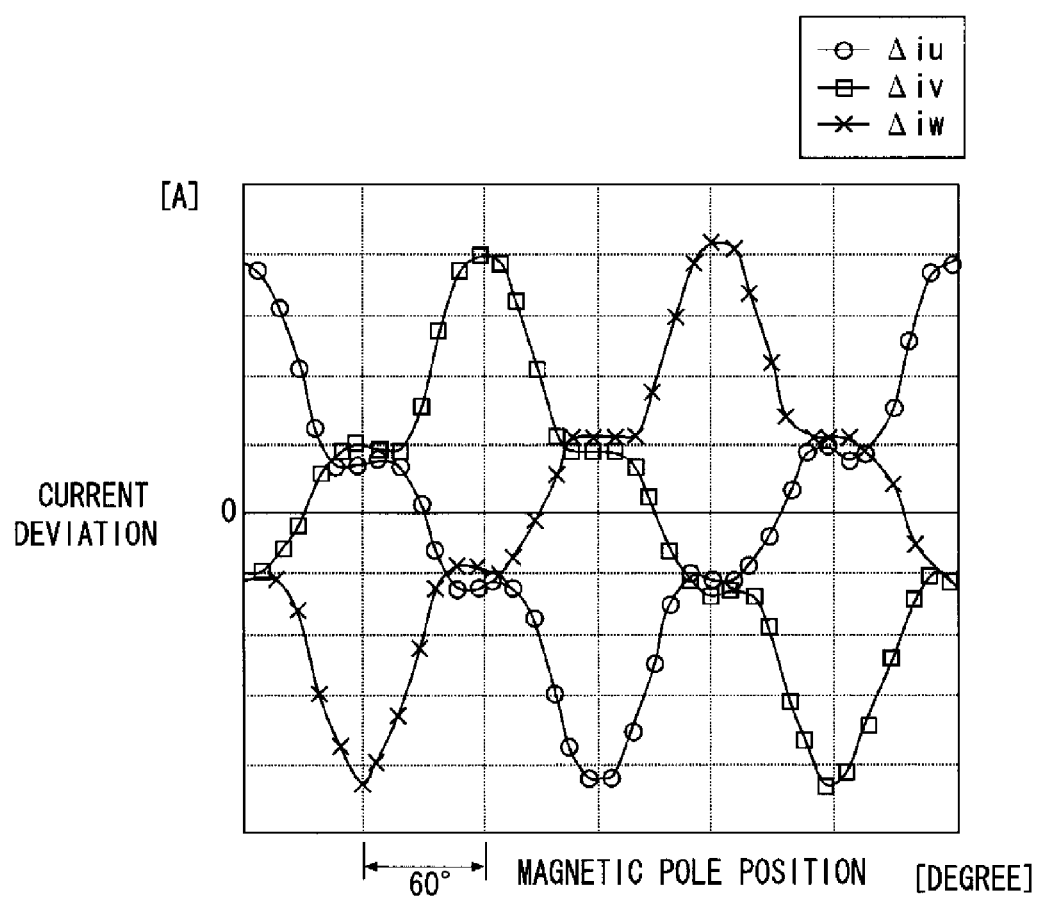
FIG. 19 is an explanation diagram showing variation in currents $\Delta i1u$, $\Delta i1v$, and $\Delta i1w$ with respect to the rotational position in the case where voltage vector instructions are outputted in a time-division manner so as to monotonously increase the phase of the voltage vector, according to the sixth embodiment of the present invention.

FIG. 19 shows variations in the currents Δi1u, Δi1v, and Δi1w with respect to the rotational position θe in the case where the voltage vector instructions are outputted in a time-division manner in order of V1→V2→V3→V4→V5→V6 in which the phases of the voltage vectors V1 to V6 monotonously increase as shown in FIG. 18.

In this case, by causing the voltage vectors V1 to V6 in the order in which their phases monotonously increase, the influence of non-linear factor due to hysteresis characteristics or the like of the rotary machine 1 can be decreased, and as shown in FIG. 19, the absolute values of the maximum value and the minimum value of each of the amplitude values Δi1u, Δi1y, and Δi1w can be made to be substantially the same. Therefore, in the sixth embodiment, as shown in FIG. 18, the occurrence order of the voltage vectors V1 to V6 is set so as to monotonously increase their phases, thereby avoiding the influence of non-linear factor due to hysteresis characteristics or the like of the rotary machine 1.

In the sixth embodiment, the voltage vector instructions are outputted so as to cause the voltage vectors V1 to V6 in the order in which their phases monotonously increase. However, also in the case where the voltage vector instructions are outputted so as to cause the voltage vectors V1 to V6 in order of V6→V5→V4→V3→V2→V1 in which their phases monotonously decrease, the absolute values of the maximum value and the minimum value of each of the amplitude values Δi1u, Δi1v, and Δi1w can be made to be substantially the same, thereby avoiding the influence of non-linear factor due to hysteresis characteristics or the like of the rotary machine 1.

Next, the rotational position estimation means 602, after calculating the currents Δi1u, Δi1y, and Δi1w shown by the above expressions (35) to (37), calculates a value MAX(Δi1u, Δi1v, Δi1w, −Δi1u, −Δi1v, −Δi1w) which is the maximum one of the absolute values of the currents Δi1u, Δi1y, and Δi1w, by using the currents Δi1u, Δi1y, and Δi1w. It is noted that MAX(x1, x2, . . . , xn) means selecting the maximum one of the values x1 to xn included in the group in the parentheses.

As shown in FIG. 19, the values of the currents Δi1u, Δi1y, and Δi1w take the maximum value or the minimum value at 60-degree intervals of the rotational position θe. For example, when the rotational position θe is 0 degree, Liu takes the maximum value, and when the rotational position θe is 60 degrees, Δiw takes the minimum value. Therefore, if the values of the rotational position θe are divided into 60-degree intervals each indicated by an interval number m, the relationship between each interval and the value MAX is as follows.

| Interval Number m | Interval (θe) | MAX |
| --- | --- | --- |
| 1 | −30 to 30 degrees | Δi1u |
| 2 | 30 to 90 degrees | −Δi1w |
| 3 | 90 to 150 degrees | Δi1v |
| 4 | 150 to 210 degrees | −Δi1u |
| 5 | 210 to 270 degrees | Δi1w |
| 6 | 270 to 330 degrees | −Δi1v |

It is noted that the reason for attaching minus signs to values in the parentheses of the value MAX like −Δi1u, −Δi1y, and −Δi1w is because, for example, when the rotational position θe is 60 degrees and Δi1w takes the minimum value, this minimum value can be calculated as the maximum value.

In specific calculation of the value MAX, for example, when the rotational position θe is 60 degrees, the value MAX (Δi1u, Δi1v, Δi1w, −Δi1u, −Δi1y, −Δi1w) is −Δi1w, and the interval number m=2 is obtained, whereby the rotational position θe at this time is found to be within a range of 30 to 90 degrees.

As a specific calculation method, the rotational position estimation means 602 stores in advance the correspondence relationship between the interval number m and the value MAX as a table, in the memory 622, obtains the interval number m, based on the value MAX that has been eventually calculated, and sends the interval number m to the output circuit 625. The output circuit 625 stores in advance the correspondence relationship between the interval number m and the interval or a specific rotational position θe as a table, and outputs the rotational position θe corresponding to the inputted interval number m, to the outside.

Here, with reference to a flowchart shown in FIG. 20, estimation calculation processing of the rotational position θe by the rotational position estimation means 602 according to the sixth embodiment will be described. It is noted that in FIG. 20, a character S means each processing step.

Figure 20:
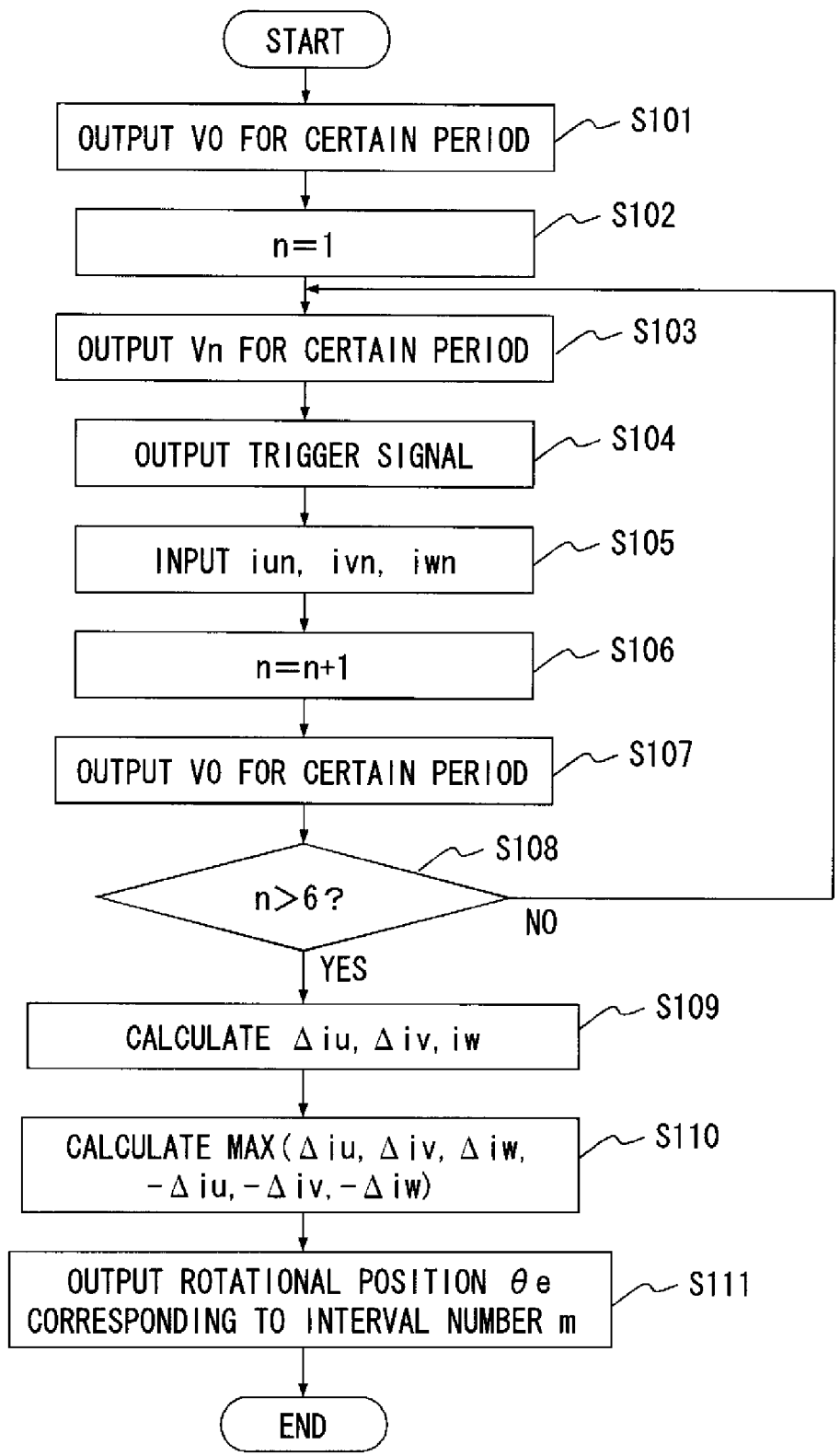
FIG. 20 is a flowchart showing the procedure of rotational position estimation by the rotational position estimation means, according to the sixth embodiment of the present invention.

In FIG. 20, first, the rotational position estimation means 602 outputs voltage vector instructions for causing the voltage vector V0 described above, to the voltage application unit 31, for a certain period (S101), and then sets a variable n at "1" (S102). Further, based on the set value of n, the rotational position estimation means 602 outputs voltage vector instructions for causing the voltage vector Vn (at first, n=1), to the voltage application unit 31 via the switch section 603, for a certain period sufficient for magnetically saturating the rotary machine 1 (S103).

Then, just after the occurrence of the voltage vector Vn is finished, a trigger signal is outputted to the current detection section 604 (S104). Then, the currents i1u, i1v, and i1w for the respective phases are obtained from the current detection section 604 (S105). For example, if the variable n is "1", the currents i1u1, i1v1, and i1w1 corresponding to voltage vector instructions for causing the voltage vector V1 are obtained.

Then, the variable n is incremented by 1 (S106), and voltage vector instructions for causing the voltage vector V0 is outputted to the voltage application unit 31 for a certain period, again (S107). Then, whether or not the variable n is larger than "6" is determined (S108). If the variable n is not larger than "6" (NO in S108), the process proceeds to S103. Then, the rotational position estimation means 602 repeats the processing of outputting voltage vector instructions for causing the voltage vector Vn having a phase further advanced by 60 degrees, to the voltage application unit 31 via the switch section 603, for a certain period sufficient for magnetically saturating the rotary machine 1, and then obtaining the currents i1u, i1v, and i1w for the respective phases.

On the other hand, if the variable n is larger than n "6" (YES in S108), the rotational position estimation means 602 calculates the currents Δi1u, Δi1v, and Δi1w (S109). For example, the sum of the current i1u1 when the voltage vector V1 occurs and the current i1u4 when the voltage vector V4 having a phase different from that of the voltage vector V1 by 180 degrees occurs, is calculated and stored as the current Δi1u in the memory 622. Similarly, the currents Δi1y and Δi1w are calculated and stored in the memory 622.

Then, the rotational position estimation means 602 calculates the value MAX(Δi1u, Δi1y, Δi1w, −Δi1u, −i1y, −Δi1w) (S110), and outputs the interval number m corresponding to the obtained value MAX to the output circuit 625. The output circuit 625 outputs the rotational position θe corresponding to the inputted interval number m to each of the coordinate converters 104, 105, 108, and 110 via the switch section 112 (S111), to finish the process.

It is noted that in S105 for obtaining the currents i1u, i1v, and i1w, only the currents i1u1, i1w2, i1v3, i1u4, i1w5, and i1v6, which are needed for calculating the currents Δi1u, Δi1v, and Δi1w, may be obtained.

Although in the sixth embodiment, the rotational position θe is outputted based on the magnitude relationship among the currents Δi1u, Δi1v, and Δi1w, the present invention is not limited thereto. For example, the rotational position θe may be outputted based on the signs of the currents Δi1u, Δi1y, and Δi1w.

That is, by using the interval number m and the interval described above, the relationship among these elements and the signs of the currents Δi1u, Δi1y, and Δi1w is as follows.

| Interval Number m | Interval | Δi1u | Δi1v | Δi1w |
|---|---|---|---|---|
| 1 | −30 to 30 degrees | + | − | − |
| 2 | 30 to 90 degrees | + | + | − |
| 3 | 90 to 150 degrees | − | + | − |
| 4 | 150 to 210 degrees | − | + | + |
| 5 | 210 to 270 degrees | − | − | + |
| 6 | 270 to 330 degrees | + | − | + |

By using the above relationship among the interval number m, the interval, and the signs of the currents Δi1u, Δi1y, and Δi1w, the value of the interval number m can be determined from a combination of the signs of the currents Δi1u, Δi1v, and Δi1w.

As described above, in the estimation method for the rotational position θe according to the sixth embodiment, voltage vector instructions are outputted to the voltage application unit to cause a voltage vector in at least one winding group (here, the first winding group 11), and the rotational position θe is estimated based on current flowing in the winding group. Therefore, even when rotation of the multiplex-winding rotary machine 1 is stopped, the present rotational position θe of the rotary machine 1 can be estimated.

As described above, according to the sixth embodiment, when the failure determination means 5 has outputted a failure signal, a voltage vector based on voltage vector instructions is applied to at least one winding group, and the rotational position θe is estimated from current flowing in the winding group. Therefore, even when the rotary machine 1 is stopped, the present rotational position θe can be accurately estimated. Thus, it becomes possible to output appropriate voltage instructions v1u*, v1v*, v1w*, v2u*, v2v*, and v2w* to the voltage application means 3, thereby providing effect of smoothly restarting the driving.

Although in the first to sixth embodiments described above, the rotational position θe is estimated based on current or voltage with respect to the first winding group 11 in accordance with failure of the rotational position detection means 4, the present invention is not limited thereto. The rotational position θe may be estimated based on current or voltage with respect to the second winding group 12.

The present invention is not limited to the configurations of the first to sixth embodiments described above. Various applications and modifications can be made without departing from the intent of the present invention, and the configurations of the first to sixth embodiments can be combined as appropriate.

Various modifications and alterations of this invention will be apparent to those skilled in the art without departing from the scope and spirit of this invention, and it should be understood that this is not limited to the illustrative embodiments set forth herein.

What is claimed is:

1. A driving apparatus for a multiplex-winding rotary machine, the driving apparatus comprising:
   a multiplex-winding rotary machine having a plurality of winding groups each including windings for a plurality of phases;
   rotational position detection means which detects the rotational position of the multiplex-winding rotary machine;
   failure determination means which determines whether or not the rotational position detection means has failed;
   control means which calculates a voltage instruction with respect to the plurality of winding groups, based on the rotational position detected by the rotational position detection means; and
   a plurality of voltage application means which apply voltage to the plurality of winding groups, based on the voltage instruction, wherein
   the control means, when the failure determination means has determined that the rotational position detection means has failed, outputs a voltage instruction for rotational position estimation to the voltage application means corresponding to at least one of the plurality of winding groups, and estimates the rotational position, based on at least one of voltage and current obtained from the winding group in accordance with the voltage instruction.

2. The driving apparatus for a multiplex-winding rotary machine according to claim 1, wherein
   the control means, when the voltage application means applies voltage to the winding group based on the voltage instruction for the rotational position estimation, controls current flowing in the winding group so as to be smaller than current flowing in the other winding group.

3. The driving apparatus for a multiplex-winding rotary machine according to claim 2, wherein
   the control means, when the voltage application means applies voltage to the winding group based on the voltage instruction for the rotational position estimation, controls current flowing in the winding group so as to be zero.

4. The driving apparatus for a multiplex-winding rotary machine according to claim 3, wherein
   the control means, when controlling current flowing in the winding group so as to be zero, controls the current flowing in the other winding group so as to be increased by the decreased amount by which the current flowing in the winding group is decreased from that before the control.

5. The driving apparatus for a multiplex-winding rotary machine according to claim 2, wherein
   the control means, when controlling current flowing in the winding group so as to be smaller than current flowing in the other winding group, controls the current flowing in the other winding group so as to be increased by the decreased amount by which the current flowing in the winding group is decreased from that before the control.

6. The driving apparatus for a multiplex-winding rotary machine according to claim 1, wherein
   the control means, when the voltage application means applies voltage to the winding group based on the voltage instruction for the rotational position estimation, controls the voltage instruction so as to short-circuit the windings for all the phases included in the winding group.

7. The driving apparatus for a multiplex-winding rotary machine according to claim 1, wherein
   the control means, when the voltage application means applies voltage to the winding group based on the voltage instruction for the rotational position estimation, controls the voltage instruction so as to sequentially cause 6N (N is an integer equal to or larger than 1) voltage vectors having the same amplitude and having phases separated from each other by the same degree, in the winding group, for a period sufficient for magnetically saturating the winding group.

8. The driving apparatus for a multiplex-winding rotary machine according to claim 1, wherein the plurality of phases for each of the winding groups comprises three phase windings.

9. A driving apparatus for a multiplex-winding rotary machine, the driving apparatus comprising:
- a multiplex-winding rotary machine having a plurality of winding groups each including windings for a plurality of phases;
- rotational position detector which detects the rotational position of the multiplex-winding rotary machine;
- failure determination device which determines whether or not the rotational position detector has failed;
- a controller which calculates a voltage instruction with respect to the plurality of winding groups, based on the rotational position detected by the rotational position detector; and
- a plurality of voltage applicators which apply voltage to the plurality of winding groups, based on the voltage instruction, wherein
- the controller is configured such that in response to the failure determination device determining that the rotational position detector has failed, outputs a voltage instruction for rotational position estimation to the voltage applicator corresponding to at least one of the plurality of winding groups, and estimates the rotational position, based on at least one of voltage and current obtained from the winding group in accordance with the voltage instruction.

10. The driving apparatus for a multiplex-winding rotary machine according to claim 9, wherein
the controller, when the voltage applicator applies voltage to the winding group based on the voltage instruction for the rotational position estimation, controls current flowing in the winding group so as to be smaller than current flowing in the other winding group.

11. The driving apparatus for a multiplex-winding rotary machine according to claim 10, wherein
the controller, when the voltage applicator applies voltage to the winding group based on the voltage instruction for the rotational position estimation, controls current flowing in the winding group so as to be zero.

12. The driving apparatus for a multiplex-winding rotary machine according to claim 11, wherein
the controller, when controlling current flowing in the winding group so as to be zero, controls the current flowing in the other winding group so as to be increased by the decreased amount by which the current flowing in the winding group is decreased from that before the control.

13. The driving apparatus for a multiplex-winding rotary machine according to claim 10, wherein
the controller, when controlling current flowing in the winding group so as to be smaller than current flowing in the other winding group, controls the current flowing in the other winding group so as to be increased by the decreased amount by which the current flowing in the winding group is decreased from that before the control.

14. The driving apparatus for a multiplex-winding rotary machine according to claim 9, wherein
the controller, when the voltage applicators applies voltage to the winding group based on the voltage instruction for the rotational position estimation, controls the voltage instruction so as to short-circuit the windings for all the phases included in the winding group.

15. The driving apparatus for a multiplex-winding rotary machine according to claim 9, wherein
the controller, when the voltage applicator applies voltage to the winding group based on the voltage instruction for the rotational position estimation, controls the voltage instruction so as to sequentially cause 6N (N is an integer equal to or larger than 1) voltage vectors having the same amplitude and having phases separated from each other by the same degree, in the winding group, for a period sufficient for magnetically saturating the winding group.

16. The driving apparatus for a multiplex-winding rotary machine according to claim 9, wherein the plurality of phases for each of the winding groups comprises three phase windings.

* * * * *